United States Patent
You et al.

(10) Patent No.: US 9,202,127 B2
(45) Date of Patent: Dec. 1, 2015

(54) PARALLEL PROCESSING METHOD AND APPARATUS FOR DETERMINING TEXT INFORMATION FROM AN IMAGE

(75) Inventors: Kisun You, Suwon (KR); Hyung-Il Koo, Seoul (KR); Hyun-Mook Cho, Seoul (KR)

(73) Assignee: QUALCOMM Incorporated, San Diego, CA (US)

( * ) Notice: Subject to any disclaimer, the term of this patent is extended or adjusted under 35 U.S.C. 154(b) by 532 days.

(21) Appl. No.: 13/539,797

(22) Filed: Jul. 2, 2012

(65) Prior Publication Data

US 2013/0011055 A1 Jan. 10, 2013

Related U.S. Application Data

(60) Provisional application No. 61/505,984, filed on Jul. 8, 2011.

(51) Int. Cl.
*G06K 9/36* (2006.01)
*G06K 9/32* (2006.01)
*G06K 9/00* (2006.01)
*G06K 9/03* (2006.01)
*G06K 9/38* (2006.01)

(52) U.S. Cl.
CPC ............ *G06K 9/325* (2013.01); *G06K 9/00973* (2013.01); *G06K 9/036* (2013.01); *G06K 9/38* (2013.01); *G06K 2209/01* (2013.01)

(58) Field of Classification Search
USPC ................................................ 382/165, 176
See application file for complete search history.

(56) References Cited

U.S. PATENT DOCUMENTS

| | | |
|---|---|---|
| 6,282,314 B1 | 8/2001 | Sugiura et al. |
| 2004/0197009 A1 | 10/2004 | Belkacem |
| 2007/0253040 A1 | 11/2007 | Lee et al. |
| 2008/0002916 A1 | 1/2008 | Vincent et al. |
| 2010/0215261 A1 | 8/2010 | Kim et al. |

(Continued)

FOREIGN PATENT DOCUMENTS

| | | |
|---|---|---|
| DE | 102009058605 | 6/2011 |
| JP | 2000148908 A | 5/2000 |

(Continued)

OTHER PUBLICATIONS

International Preliminary Report on Patentability for PCT/US2012/045354 mailed Oct. 21, 2013, 42 pp.

(Continued)

*Primary Examiner* — Duy M Dang
(74) *Attorney, Agent, or Firm* — Toler Law Group, PC

(57) ABSTRACT

A method for processing a multi-channel image is disclosed. The method includes generating a plurality of grayscale images from the multi-channel image. At least one text region is identified in the plurality of grayscale images and text region information is determined from the at least one text region. The method generates text information of the multi-channel image based on the text region information. If the at least one text region includes a plurality of text regions, text region information from the plurality of text regions is merged to generate the text information. The plurality of the grayscale images is processed in parallel. In identifying the at least one text region, at least one candidate text region may be identified in the plurality of grayscale images and the at least one text region may be identified in the identified candidate text region.

46 Claims, 25 Drawing Sheets

(56) References Cited

U.S. PATENT DOCUMENTS

2010/0331043 A1  12/2010  Chapman et al.
2011/0222769 A1   9/2011  Galic et al.

FOREIGN PATENT DOCUMENTS

| JP | 2002236877 A | 8/2002 |
| KR | 20090028789 A | 3/2009 |
| WO | 9201998 | 2/1992 |
| WO | 0173679 | 10/2001 |
| WO | 02080520 | 10/2002 |
| WO | 2008065520 | 6/2008 |

OTHER PUBLICATIONS

Badekas, E. et al. "Text Binarization in Color Documents," International Journal of Imaging Systems and Technology, vol. 16, Issue 6, pp. 262-274, Jul. 18, 2006.

Chen, D. et al. "Text Detection and Recognition in Images and Video Frames," Pattern Recognition, vol. 37, Issue 3, Mar. 2004, pp. 595-608, (http://m/ww.sciencedirect.com/science/article/pii/S0031320303002462).

Strouthopoulos, C. et al. "Text Extraction in Complex Color Documents." Pattern Recognition, vol. 35, Issue 8, Aug. 2002, pp. 1743-1758, <http://www.sciencedirect.com/science/article/pii/S0031320301001674>.

Written Opinion of the International Preliminary Examining Authority for International Application No. PCT/US2012/045354 mailed Jun. 17, 2013, 11 pp.

International Search Report and Written Opinion of the International Searching Authority for PCT/US2012/045354, mailed Nov. 19 2012, 18 pp.

Park, et al., "Scene Text Detection Suitable for Parallelizing on Multi-Core", 2009 16th IEEE International Conference on Image Processing (ICIP), Nov. 7, 2009, pp. 2425-2428.

Antonacopoulos, et al., "An Anthropocentric Approach to Text Extraction from WWW Images", Proceedings of the 4th IAPR International Workshop on Document Analysis Systems, DAS2000, Dec. 1, 2000, pp. 515-525.

Lienhart, et al., "Localizing and Segmenting Text in Images and Videos", IEEE Transactions on Circuits and Systems for Video Technology, vol. 12, No. 4, Apr. 1, 2002, 13 pp.

Ye, et al., "A Robust Text Detection Algorithm in Images and Video Frames", Proceedings of the 2003 Joint Conference of the Fourth International Conference on Information, Communications and Signal Processing (ICICS), Dec. 15, 2003, vol. 2, pp. 802-806.

Liang, et al., "Camera-Based Analysis of Text and Documents: A Survey", International Journal on Document Analysis and Recognition (IJDAR), vol. 7, No. 2-3, Jul. 1, 2005, pp. 84-104.

PARALLEL PROCESSING METHOD AND APPARATUS FOR DETERMINING TEXT INFORMATION FROM AN IMAGE

CROSS-REFERENCE TO RELATED APPLICATIONS

This application is based upon and claims the benefit of priority from U.S. Provisional Patent Application Ser. No. 61/505,984, filed on Jul. 8, 2011, the entire contents of which are incorporated herein by reference.

TECHNICAL FIELD

The present disclosure relates generally to processing an image. More specifically, the present disclosure relates to generating text information from a multi-channel image through parallel processing channels.

BACKGROUND

Digital images can contain a variety of objects such as text objects including characters, numbers, and symbols, and non-text objects. Among these objects, the text objects may provide contextual information which is particularly meaningful and useful to users. Conventional algorithms have often used scalar pixel values for processing such digital images. For example, conventional algorithms including SIFT (Scale Invariant Feature Transform) and MSER (Maximally Stable External Regions) have been used in detecting text objects in digital images based on scalar pixel values.

Most of the digital images in use today are color images. A color image typically includes color information such as a combination of RGB values, CMY values, or hue, brightness, and chroma values of each pixel in the image. In general, colors in digital color images are represented by multi-dimensional vectors (e.g., RGB values or CMY values). Accordingly, conventional algorithms that use scalar values for processing images are generally not suitable for recognizing text objects in color images. Instead, algorithms for recognizing text objects using vector values of pixels in color images, e.g., MSCR (Maximally Stable Color Region), have been used. However, such vector-based algorithms are generally much more complex and require far more computing resources than the scalar-based algorithms.

In order to reduce the complexity and computing resources, conventional schemes have used scalar-based algorithms to improve the processing speed in color images. For example, individual characters in text objects are recognized from an original color image by converting the original color image to an image having scalar pixel values. This process, however, may result in a loss of contrast between some text objects and their background, such that the characters in the text objects may not be properly recognized.

SUMMARY

The present disclosure provides methods and apparatus for processing a multi-channel image to generate text information associated with the multi-channel image. In these methods and apparatus, a plurality of grayscale images is generated from the multi-channel image. The text information is then generated by processing the grayscale images in parallel.

According to one aspect of the present disclosure, a method for processing a multi-channel image is disclosed. The method includes generating a plurality of grayscale images from the multi-channel image. At least one text region is identified in the plurality of grayscale images and text region information is determined from the at least one text region. The method then generates text information of the multi-channel image based on the text region information. This disclosure also describes an apparatus, a combination of means, and a computer-readable medium relating to this method.

According to another aspect of the present disclosure, an apparatus for processing a multi-channel image is disclosed. The apparatus includes at least one image converter, a plurality of text region detectors, and a merging unit. The at least one image converter generates a plurality of grayscale images from the multi-channel image. The plurality of text region detectors is configured to identify at least one text region in the plurality of grayscale images and determine text region information from the at least one text region. Text information of the multi-channel image is generated based on the text region information by the merging unit.

According to yet another aspect of the present disclosure, another method for processing a multi-channel image is disclosed. The method generates a first and a second grayscale image from the multi-channel image. A first text region is identified in the first grayscale image and a second text region is identified in the second grayscale image. In addition, first and second text region information is determined from the first and the second text regions, respectively. The method generates text information of the multi-channel image based on the first and the second text region information. This disclosure also describes an apparatus, a combination of means, and a computer-readable medium relating to this method.

According to still another aspect of the present disclosure, another apparatus for processing a multi-channel image is disclosed. The apparatus includes at least one image converter, a first text region detector, a second text region detector, and a merging unit. The at least one image converter generates a first and a second grayscale image from the multi-channel image. The first text region detector is configured to identify a first text region in the first grayscale image and determine first text region information from the first text region. Similarly, the second text region detector is configured to identify a second text region in the second grayscale image and determine second text region information from the second text region. Text information of the multi-channel image is generated based on the first and the second text region information by the merging unit.

DETAILED DESCRIPTION

Figure 1:
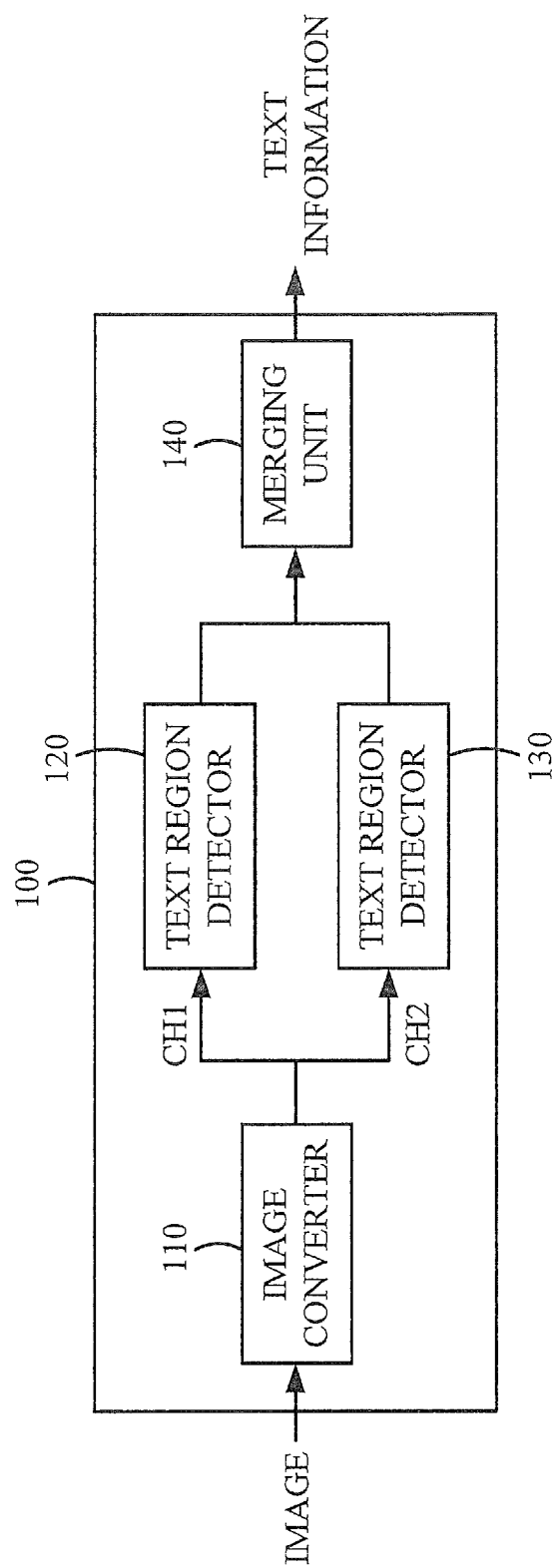
FIG. 1 illustrates an image processing apparatus configured to receive an image and generate text information from the received image according to one embodiment of the present disclosure.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram forms in order to facilitate describing one or more embodiments.

FIG. 1 illustrates an image processing apparatus 100 configured to receive an image and generate text information from the received image according to one embodiment of the present disclosure. The image processing apparatus 100 includes an image converter 110, text region detectors 120 and 130, and a merging unit 140. The received image is a multi-channel image including a plurality of channels and contains one or more text regions having texts or characters. Some examples of multi-channel images are a three channel image including RGB, YUV, or YCrCb channels or a four channel image including an additional infrared channel to the three channels.

The image converter 110 receives and converts the multi-channel image into a pair of grayscale images to be processed by a pair of processing channels CH1 and CH2. The converted images may be stored in a memory (not shown), which is accessible by the text region detectors 120 and 130 and/or the merging unit 140 for processing the stored images. Each grayscale image is a single channel image, in which a scalar value of each pixel indicates intensity of the pixel according to the channel. Typically, each pixel in a grayscale image is presented by a shade level selected from more than two levels of gray, for example, varying from black at the weakest intensity to white at the strongest intensity, and is distinct from a black-and-white binary image. For example, in the case of an RGB multi-channel image, a pair of grayscale images may be generated from R and G channels. Alternatively or additionally, a grayscale image may be generated by weighting pixel values of different channels and combining the weighted pixel values.

The pair of different grayscale images generated from the image converter 110 is input to the text region detectors 120 and 130, respectively. For example, one grayscale image composed of pixel values in an R channel may be input to the text region detector 120, while the other grayscale image composed of pixel values in a G channel may be input to the text region detector 130. Although FIG. 1 illustrates the two grayscale images and the two text region detectors 120 and 130, the numbers are presented only by way of example, and thus the image processing apparatus 100 may be configured with any suitable number of such grayscale images and text region detectors.

The text region detectors 120 and 130 are configured to identify one or more text regions in the respective grayscale images. Since the text region detectors 120 and 130 receive different grayscale images of the multi-channel image, the identified text regions may be the same or different from each other. The text region detectors 120 and 130 are further configured to determine text region information associated with the respective text regions. The text region information includes any suitable information relating to the associated text region such as location information of the text region in the grayscale image and text recognition information of any text detected and recognized in the text region. The text region information is then output from the text region detectors 120 and 130 to the merging unit 140.

In FIG. 1, if the text region detector 120 identifies two or more text regions in a received grayscale image, the text region detector 120 determines and outputs text region information associated with all of the identified text regions. On the other hand, if no text region has been identified, the text region detector 120 may output an indication that the grayscale image has no identified text region. The text region detector 130 operates in a similar manner to the text region detector 120. The text region detectors 120 and 130 in the image processing apparatus 100 define parallel processing channels CH1 and CH2. Thus, the operations of the text region detectors 120 and 130 are performed in parallel.

The merging unit 140 is configured to merge the text region information received from the text region detectors 120 and 130 and generate text information associated with the multi-channel image. In the case where the locations of the identified text regions in the processing channels CH1 and CH2 are different, the text information is generated by combining the text region information from the text region detectors 120 and 130. On the other hand, if the locations of the identified text regions are the same, the text information is generated based on the text region information having a greater likelihood of text recognition accuracy or text region identification accuracy, which will be described in more detail below.

The text recognition operation such as OCR or hand-writing recognition may be performed to recognize texts in the identified text regions in the text region detectors 120 and 130. In an alternative embodiment, such text recognition operation may be performed in the merging unit 140, instead of the text region detectors 120 and 130. In this case, the merging unit 140 may access and process the grayscale images stored in the memory to recognize texts in the identified text regions.

Figure 2:
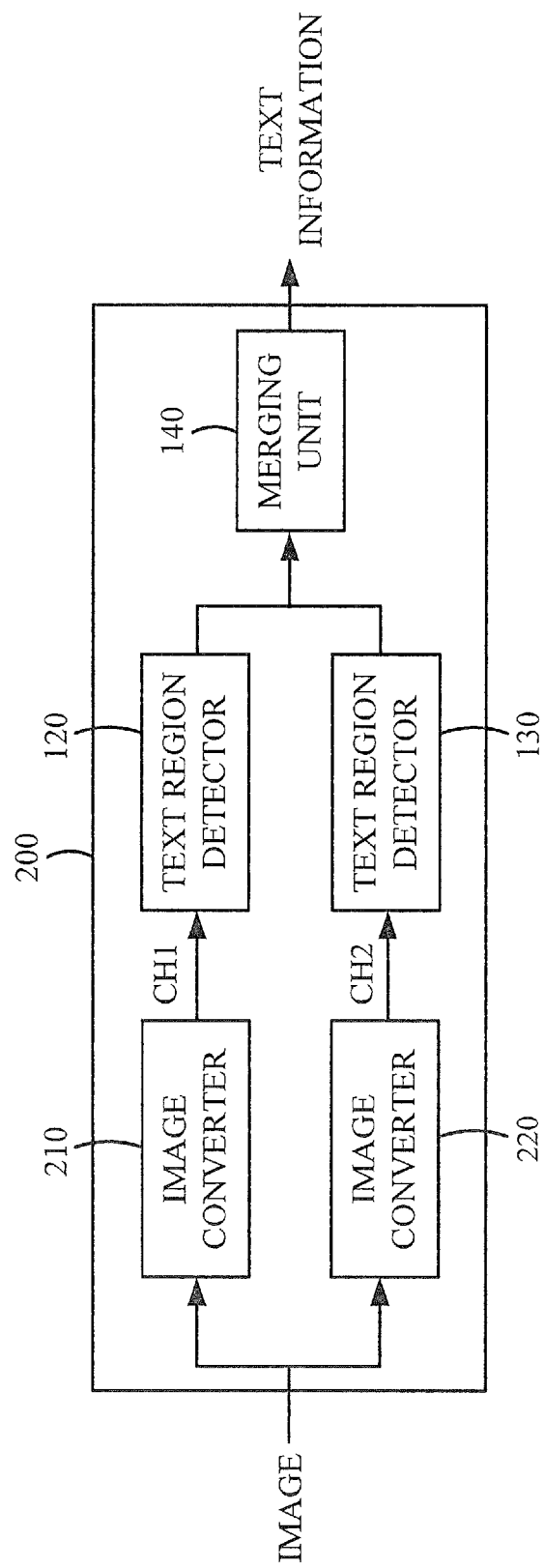
FIG. 2 illustrates another image processing apparatus configured to receive an image and generate text information from the received image according to one embodiment of the present disclosure.

FIG. 2 illustrates an image processing apparatus 200 configured to receive an image and generate text information from the received image according to another embodiment of the present disclosure. The image processing apparatus 200 includes the text region detectors 120 and 130, and the merging unit 140, which are the same or similar units as those included in the image processing apparatus 100 of FIG. 1. The image processing apparatus 200 further includes image converters 210 and 220 in place of the image converter 110 of the image processing apparatus 100. As depicted in FIG. 2, each of the image converters 210 and 220 receives a multi-channel image and generates a grayscale image. Since the image converters 210 and 220 use different conversion methods, the generated grayscale images may be different from each other. The generated grayscale images are input to the text region detectors 120 and 130, respectively. Although FIG. 2 illustrates the two image converters 210 and 220 and the two text region detectors 120 and 130, the numbers are presented only by way of example, and thus the image processing apparatus 200 may be configured with any suitable number of such image converters and text region detectors.

The operations by the text region detectors 120 and 130 and by the merging unit 140 can be performed in the same way as described with reference to FIG. 1. In this embodiment, the operation of the text region detector 120 is performed through one processing channel CH1, while the operation of the text region detector 130 is performed through the other processing channel CH2. Accordingly, the operations on the respective grayscale images can be performed in parallel with each other.

While the embodiment of FIG. 1 may be suitable for the case where processes of generating a plurality of grayscale images are associated with each other, the embodiment of FIG. 2 may be suitable for the case where such processes are hardly associated with each other. For example, the processes of generating different grayscale images from multiple channels may share intermediate processing information (e.g., certain parameters or values associated with the channels) between each other. In this case, if a single unit, i.e., the image converter 110 depicted in FIG. 1, collectively performs the grayscale image generating processes while sharing the associated information between the processes, the throughput of the entire operation may be improved.

Figure 3:
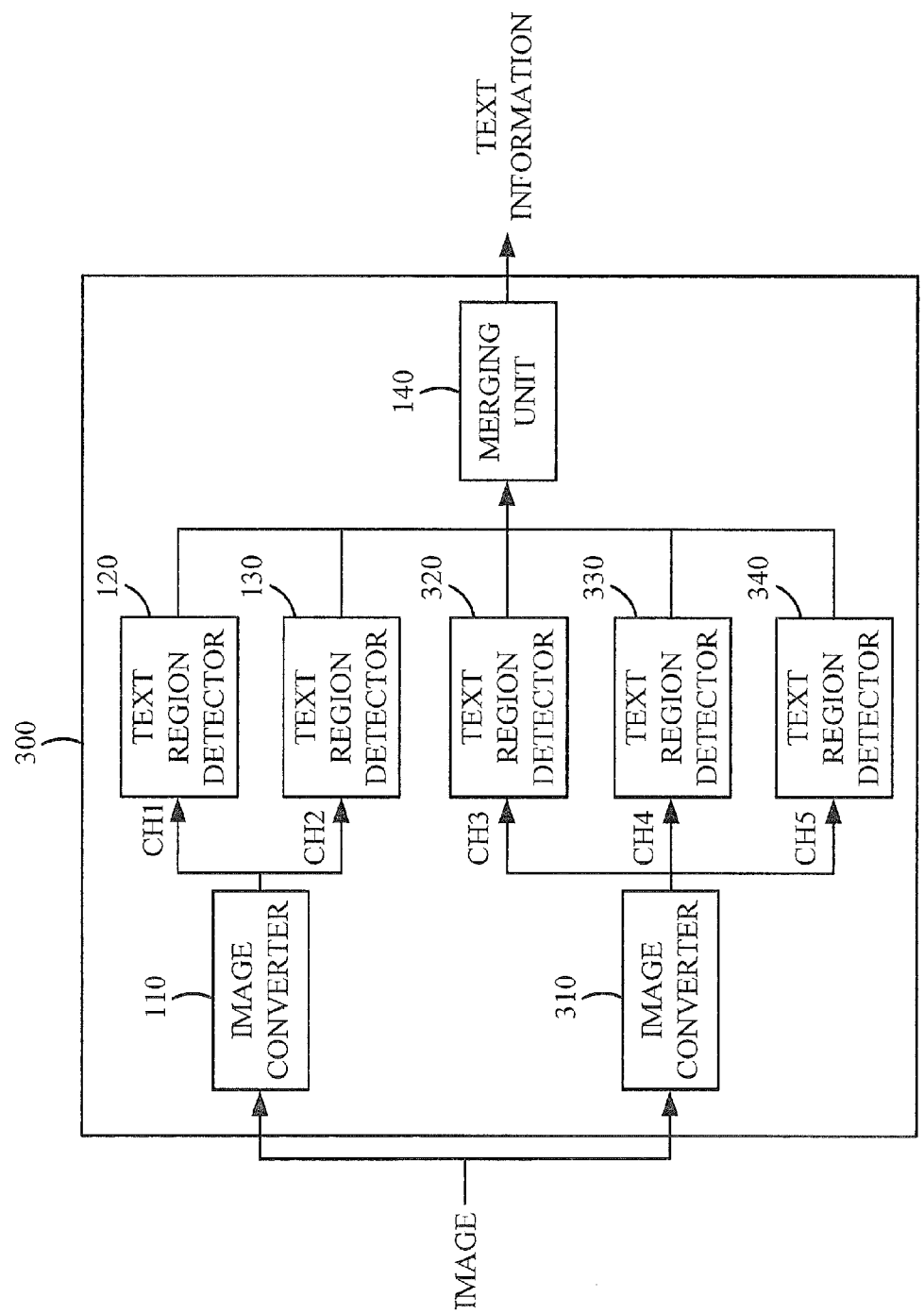
FIG. 3 illustrates yet another image processing apparatus configured to receive an image and generate text information from the received image according to one embodiment of the present disclosure.

FIG. 3 illustrates an image processing apparatus 300 configured to receive an image and generate text information from the received image according to yet another embodiment of the present disclosure. The image processing apparatus 300 includes the image converter 110, the text region detectors 120 and 130, and the merging unit 140, which are the same or similar units as those included in the image processing apparatus 100 of FIG. 1. The image processing apparatus 300 further includes an image converter 310, and text region detectors 320, 330, and 340. As depicted in FIG. 3, the image converter 110 receives a multi-channel image and generates two grayscale images. The image converter 310 also receives the multi-channel image and generates three grayscale images. Since different conversion methods are used, the five grayscale images may be different from each other. The two grayscale images generated by the image converter 110 are input to the text region detectors 120 and 130, respectively. In addition, the three grayscale images generated by the image converter 310 are input to the text region detector 320, 330, and 340, respectively. Although FIG. 3 illustrates the two image converters 110 and 310 and the five text region detectors 120, 130, 320, 330, and 340, the numbers are presented only by way of example, and thus the image processing apparatus 300 may be configured with any suitable number of such image converters and text region detectors.

The text region detectors 120, 130, 320, 330, and 340 identify a text region in the respective grayscale images and determine text region information associated with the respective identified text regions. As shown in FIG. 3, the text region detectors 120, 130, 320, 330, and 340 may perform the above-mentioned identifying and determining operations in parallel through respective processing channels CH1 to CH5. The merging unit 140 receives the determined text region information from the text region detectors 120, 130, 320, 330, and 340, and merges the received text region information to generate text information. The above described units in the image processing apparatus 100, 200, and 300 may be implemented by hardware, software executed in one or more processors in a computing device or system, and/or the combination thereof.

Figure 4:
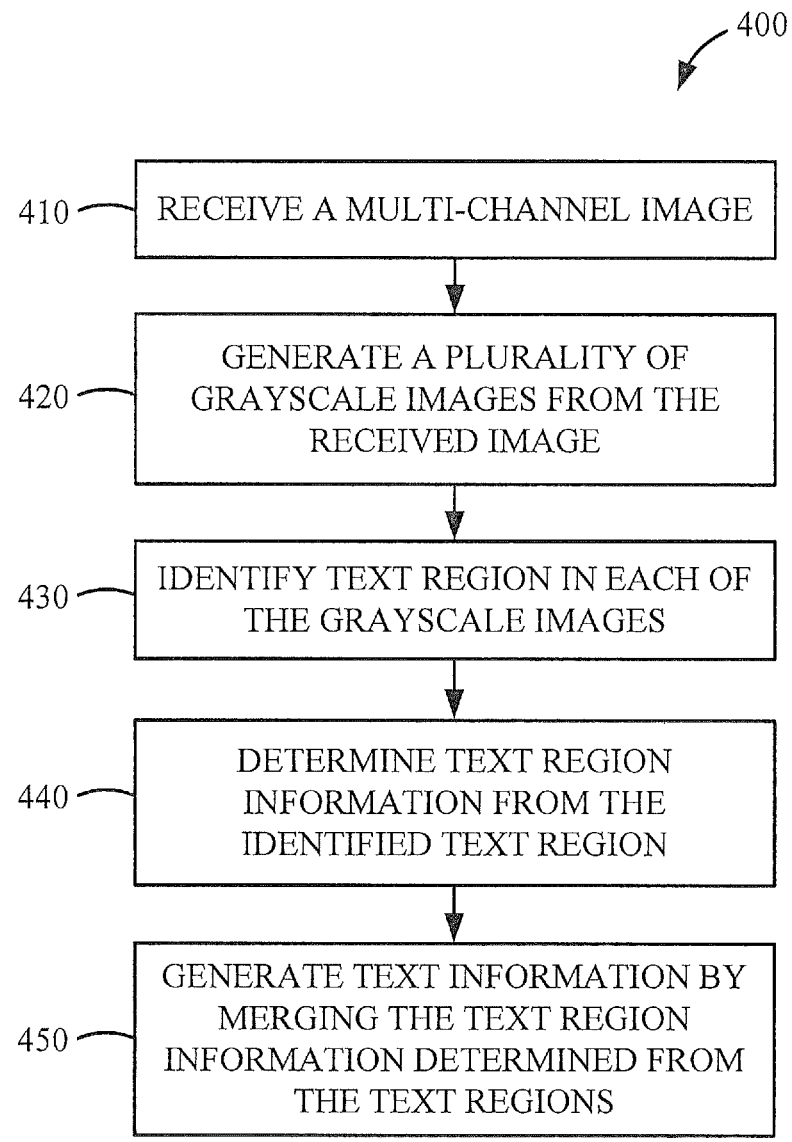
FIG. 4 represents a flowchart of a method, performed by an image processing apparatus, for receiving an image and generating text information from the received image according to one embodiment of the present disclosure.

FIG. 4 represents a flowchart of a method 400, performed by the image processing apparatus 100, for receiving an image and generating text information from the received image. First, the image converter 110 receives a multi-channel image, at 410. Thereafter, the image converter 110 generates a plurality of grayscale images from the received multi-channel image by using a variety of image conversion methods, at 420. The different grayscale images are input to the corresponding text region detectors 120 and 130 and each text region detector identifies a text region in its received grayscale image, at 430. Each of the text region detectors 120 and 130 further determines text region information associated with its identified text region, at 440. The merging unit 140 receives the text region information from the text region detectors 120 and 130 and generates text information by merging the received text region information, at 450. The above operations described with reference to FIG. 4 may also be performed in the apparatus 200 and 300 using the above described units.

Figure 5:
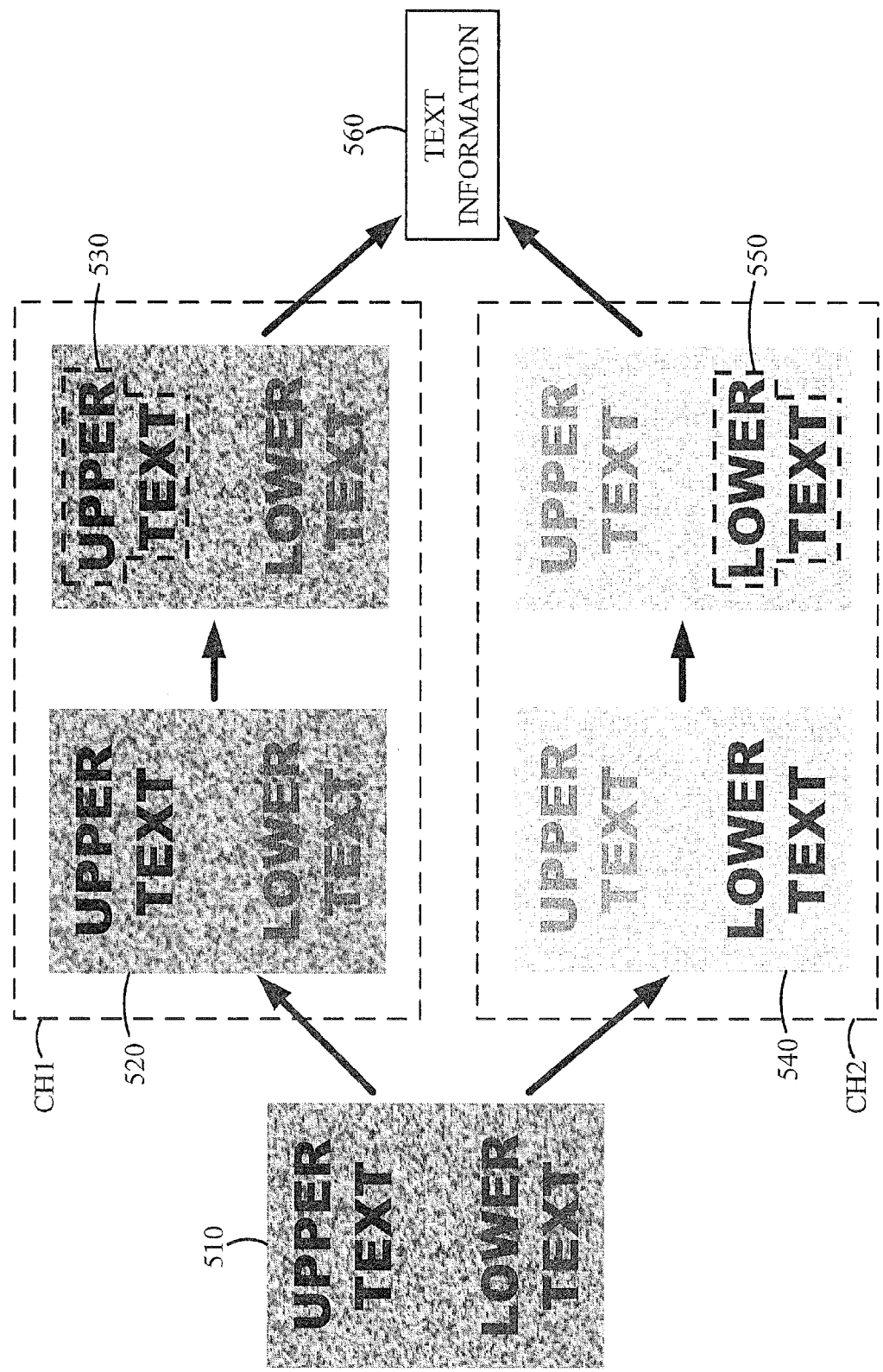
FIG. 5 illustrates a diagram of generating text information from a multi-channel image using processing channels arranged in parallel in accordance with one embodiment of the present disclosure.

FIG. 5 illustrates a diagram of generating text information 560 from a multi-channel image 510 using the processing channels CH1 and CH2 arranged in parallel in accordance with one embodiment of the present disclosure. The multi-channel image 510 includes two text portions, one in the upper portion ("UPPER TEXT") and the other in the lower portion ("LOWER TEXT"). The image converter 110 converts the multi-channel image 510 into two different grayscale images 520 and 540 for the processing channels CH1 and CH2, respectively, by using different image conversion methods as described above. The conversion of a multi-channel image into different grayscale images may render some text portions to become more distinctive for easier detection while some others may become less distinctive in a grayscale image. In the converted grayscale image 520, the text in the upper portion "UPPER TEXT" remains distinctive while the text in the lower portion "LOWER TEXT" is not readily distinguishable from the background. In contrast, in the converted grayscale image 540, the text in the lower portion "LOWER TEXT" appears more distinctive against the background while the text in the upper portion "UPPER TEXT" is not readily distinguishable from the background.

Upon receiving the grayscale image 520, the text region detector 120 in the processing channel CH1 processes the image 520 to identify a text region 530 containing "UPPER TEXT" in the image 520. Likewise, the text region detector 130 in the processing channel CH2 processes the image 540 to identify a text region 550 containing "LOWER TEXT" in the image 540. Consequently, the portions that do not contain any recognizable text (e.g., the lower portion in the grayscale image 520 and the upper portion in the grayscale image 540) are not identified as text regions. In addition, the text region detectors 120 and 130 determine and output text region information associated with the identified text regions 530 and 550, respectively.

The text region information associated with the text regions 530 and 550 is provided to the merging unit 140 from the processing channels CH1 and CH2, respectively. The merging unit 140 then merges the text region information from the processing channels CH1 and CH2 to generate text information 560 for the multi-channel image 510. The above operations described with reference to FIG. 5 may also be performed in the apparatus 200 and 300 using the above described units.

Figure 6:
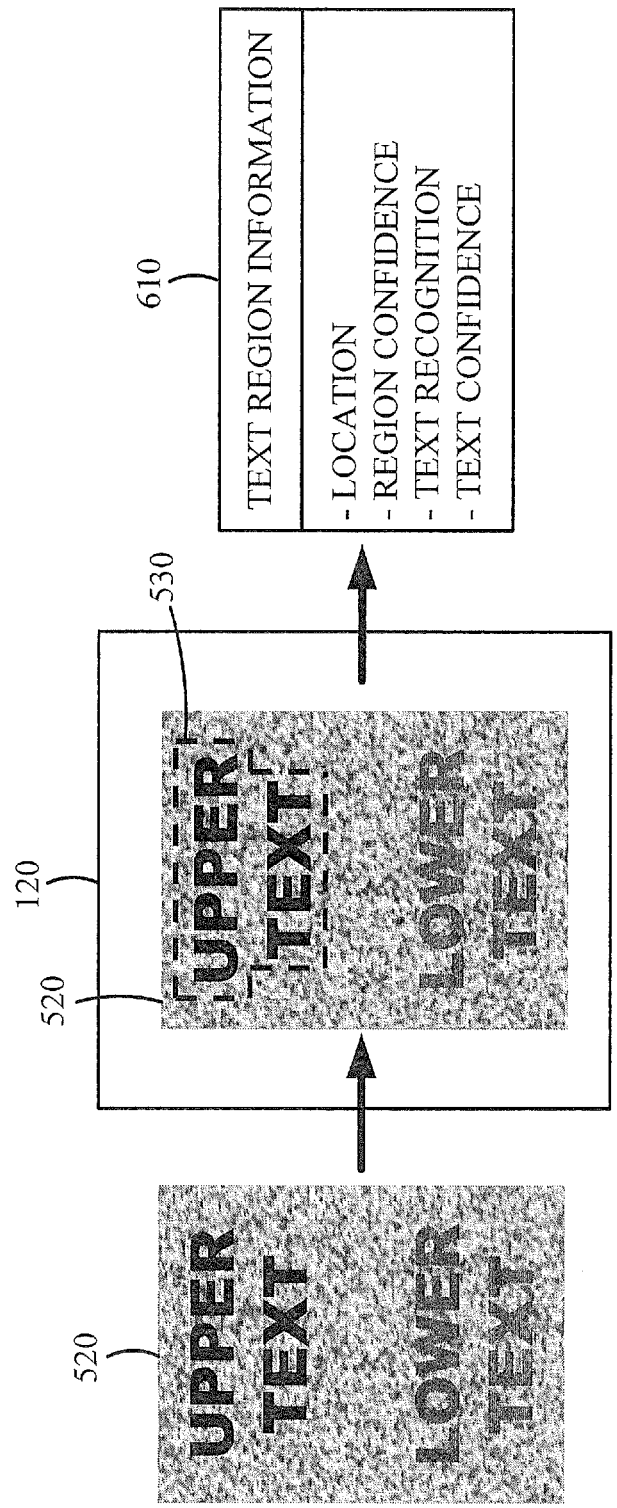
FIG. 6 illustrates a more detailed diagram of determining text region information associated with a text region for a processing channel.

FIG. 6 illustrates a more detailed diagram of determining text region information 610 associated with the text region 530 for the processing channel CH1. As set forth above, "UPPER TEXT" in the upper portion of the grayscale image 520 is distinct from its background. In the present disclosure, such a distinct text (or a set of characters that are located close to each other) is referred to as a text component and can be identified as a text region. Thus, the text region detector 120 identifies a region containing the text component, i.e., "UPPER TEXT," as the text region 530. In identifying the text region 530, the boundary of the text region 530 is configured to include the text component according to the arrangement of the characters in the text component.

Once the text region 530 has been identified, the text region detector 120 determines the text region information 610 associated with the text region 530. For example, the text region information 610 includes location information indicating a location of the text region 530 in the grayscale image 520 (e.g., coordinates of vertices of the text region 530) and region confidence information indicating a confidence value of the identified text region 530 (e.g., a numerical value from 0.0 to 1.0, or 0% to 100%). For example, the region confidence information may be a value indicating a degree of accuracy for the identified text region 530 as containing a text component.

In the case where the text region detector 120 performs a text recognition operation on the identified text region 530, the text region information 610 may further include text recognition information indicating a recognized text in the text region 530 (in this example, "UPPER TEXT") and text confidence information indicating a confidence value of the recognized text (e.g., a numerical value from 0.0 to 1.0, or 0% to 100%). For example, the text confidence information may be a value indicating the degree of accuracy of the recognized text. The text can be recognized and its confidence value can be calculated by using conventional OCR techniques. In determining the text region information 610, the text recognition operation may be performed only on the text region 530, instead of the entire grayscale image 520. By performing the text recognition on only the identified text region 530, the area on which the text recognition operation is performed can be reduced substantially, such that the processing time and required computing resources are reduced.

Figure 7:
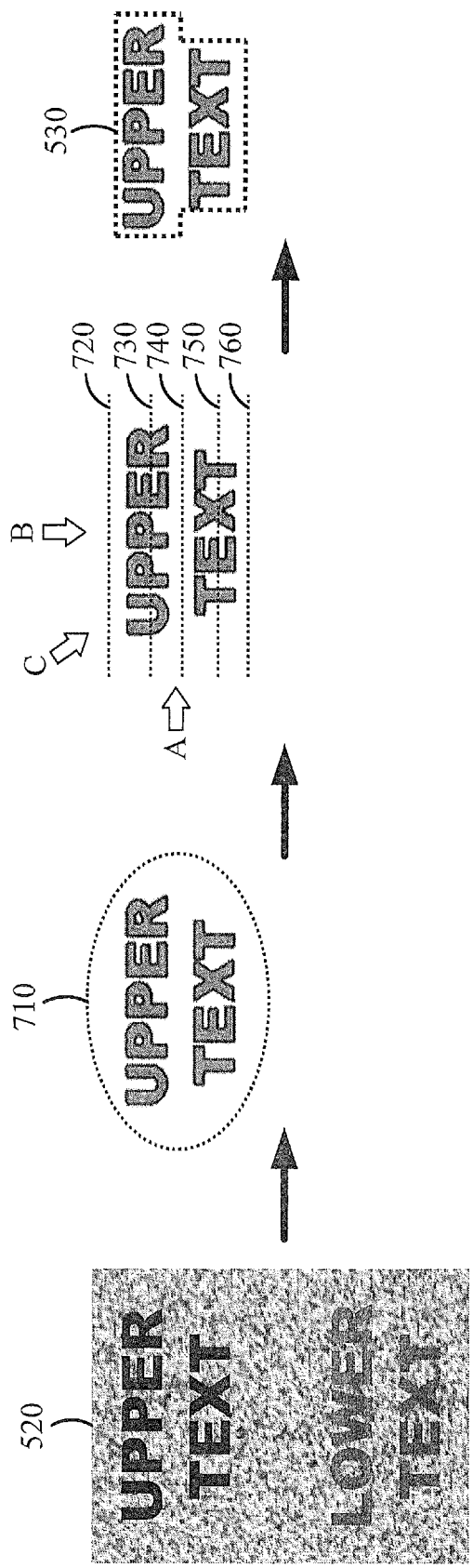
FIG. 7 illustrates an operation, performed by a text region detector, of identifying the text region in a grayscale image through a blob detection technique.

FIG. 7 illustrates an operation, performed by the text region detector 120, of identifying the text region 530 in the grayscale image 520 using a blob detection technique. The grayscale image 520 includes the distinct text component, "UPPER TEXT," in its upper portion. The text region detector 120 performs a blob detection operation to determine blobs of the individual characters in the text region. To be specific, the text region detector 120 identifies homogenous regions to determine the blobs. For example, in FIG. 7, a character "U," "E," "T," or "X" has a single homogenous region outlined by the character's outer boundary. On the other hand, a character "P" or "R" has two homogenous regions where one of the two homogenous regions is outlined by the character's outer boundary and the other homogenous region is outlined by an (circle-like) inner boundary. Based on the identified homogenous regions, the text region detector 120 then determines certain homogenous regions as blobs that represent characters.

A blob clustering operation is then performed to determine a cluster 710 containing the blobs as determined above. The blob clustering operation may utilize location, intensity and/or stroke-width information of the blobs. For example, blobs that are derived from a single text would be within a close proximity to each other. In addition, such blobs may have same or similar intensities and stroke-widths. As such, if certain blobs satisfy the above requirements, these blobs can be merged into a cluster, as the cluster 710 in FIG. 7.

Then, a projection profile analysis may be performed to determine a direction along which the characters in the text component are aligned. For example, a sum of intensity values of pixels in the blobs is calculated along a horizontal line 720 parallel to the direction of an arrow A. Further, a sum of pixel intensity values is calculated along each of additional parallel horizontal lines 730, 740, 750, and 760. In addition, a sum of pixel intensity values is calculated along each of vertical lines parallel to the direction of an arrow B and also along each of inclined lines parallel to the direction of an arrow C. Given that the intensity value of pixels within a blob is higher than the intensity value of pixels outside the blob, since the lines 730 and 750 pass through the blobs and the lines 720, 740, and 760 do not pass through the blobs, as shown in FIG. 7, the sums of pixel intensity values along the lines 730 and 750 will be larger than those along the remaining three lines 720, 740, and 760.

In an embodiment, the sum of intensity values along a line may be compared with a predetermined reference value, such that when the sum exceeds the predetermined reference value, it is determined that blobs are present along the line. In contrast, if the sum does not exceed the predetermined reference value, it is determined that blobs are not present along the line. In the example of FIG. 7, the sums of pixel intensity values along the lines 730 and 750 may be larger than a predetermined reference value while the sums along the lines 720, 740, and 760 may be smaller than the predetermined reference value. In the case of the vertical lines, most of these lines pass through the blobs, and the sums along these vertical lines will be larger than the predetermined reference value. Similarly, in the case of the inclined lines, most of these lines pass through the blobs, and the sums along these inclined straight lines will be larger than the predetermined reference value. The text component is then determined to be aligned in the horizontal direction because the sums of pixel intensity values along the horizontal lines include the least number of the sums larger than the predetermined reference value. Once the direction of the text component has been determined, the text region 530 may be identified according to well-known text region detection algorithms.

Further, the region confidence value for indicating a degree of accuracy for the identified text region 530 can be determined by using machine learning technologies. Text components and non-text components have different characteristics in view of their shape, regularities of size, width, and length, or the like. For example, blobs determined from a text component may have considerably regular stroke-widths, while blobs determined from a non-text component may have varying stroke-widths. Accordingly, such characteristics of a text component and a non-text component can be extracted from a set of training text/non-text component samples using conventional machine learning techniques, and can be stored in a machine learning database. For example, the database may include a number of reference characteristics of text components and non-text component. Once the text region 530 is identified as above, the database can compare the characteristics of the text region 530 with the reference characteristics and then determine the region confidence value by reflecting how much the text region 530 meets or matches the reference characteristics of text-components.

Figure 8:
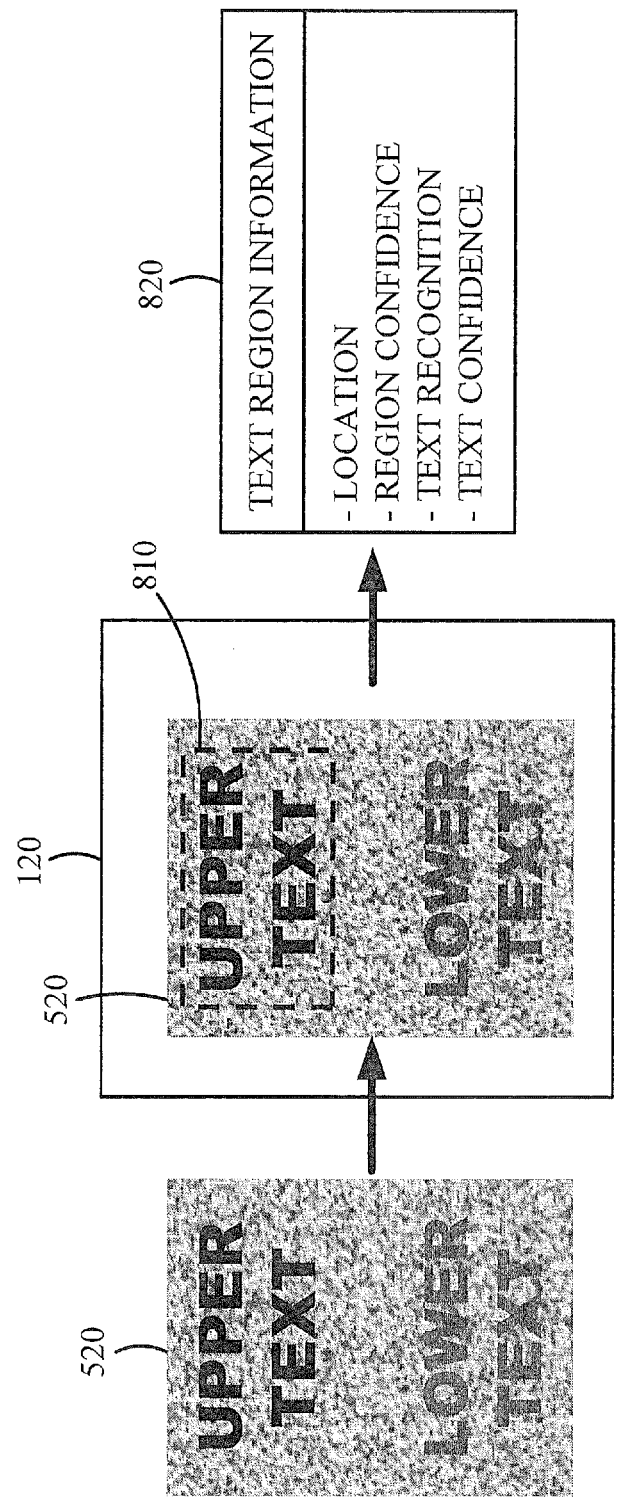
FIG. 8 illustrates a more detailed diagram of determining text region information associated with a text region in the grayscale image for the processing channel.

FIG. 8 illustrates another more detailed diagram of determining text region information 820 associated with a text region 810 in the grayscale image 520 for the processing channel CH1. In FIG. 8, the text region detector 120 identifies a region containing the text component, i.e., "UPPER TEXT" in the upper portion, as the text region 810. However, unlike the embodiment of FIG. 6, the boundary of the text region 810 is of a rectangular shape. For example, the rectangle may be the smallest rectangle which is capable of containing the text component. The text region detector 120 then determines and outputs the text region information 820 associated with the text region 810. Similar to FIG. 6, the text region information 820 may include location information, region confidence information, text recognition information, and text confidence information.

Figure 9:
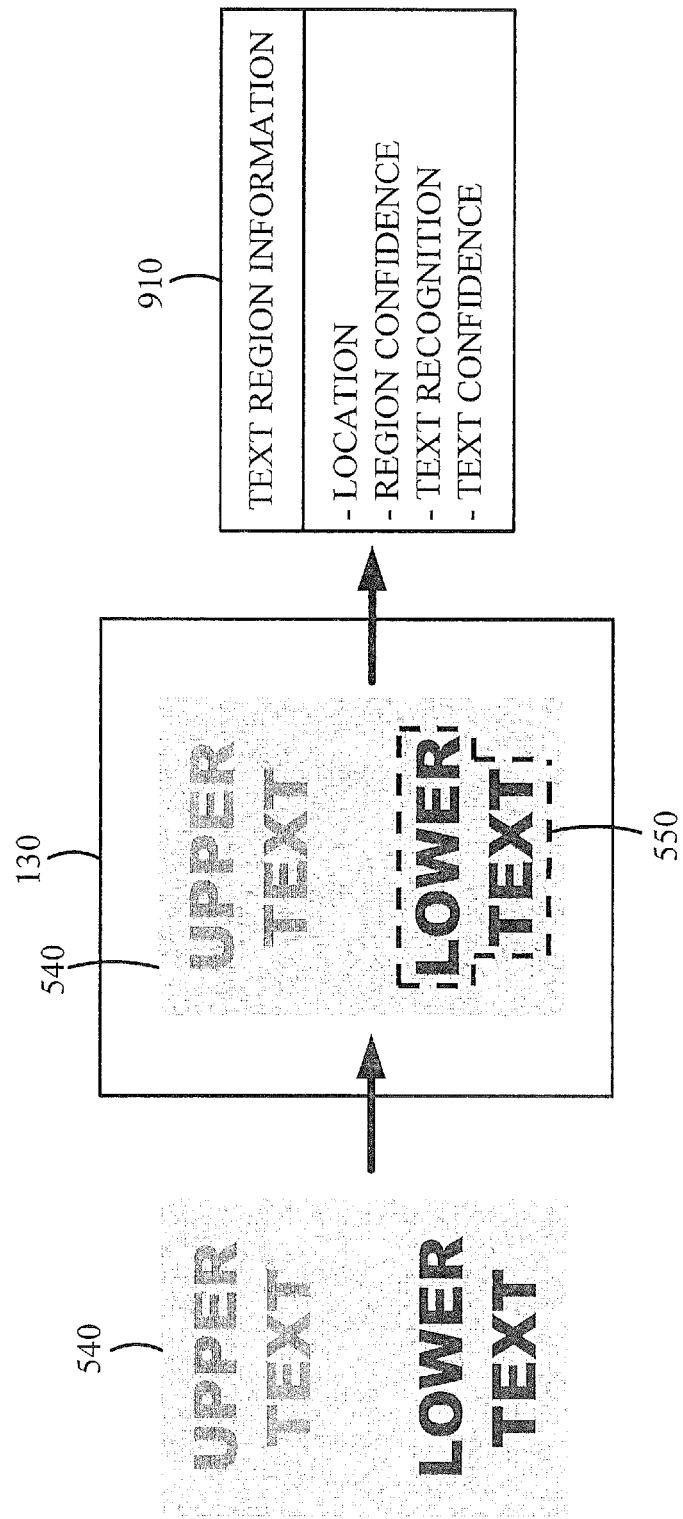
FIG. 9 illustrates a more detailed diagram of determining text region information associated with another text region in another grayscale image for another processing channel.

FIG. 9 illustrates a more detailed diagram of determining text region information 910 associated with the text region 550 in the grayscale image 540 for the processing channel CH2. In the same way as described with reference to FIG. 6, the text region detector 130 identifies a region containing the text component, i.e., "LOWER TEXT" in the lower portion, as the text region 550. The text region detector 130 then determines and outputs the text region information 910 associated with the text region 550. Similarly, the text region information 910 may include location information, region confidence information, text recognition information, and text confidence information.

Figure 10:
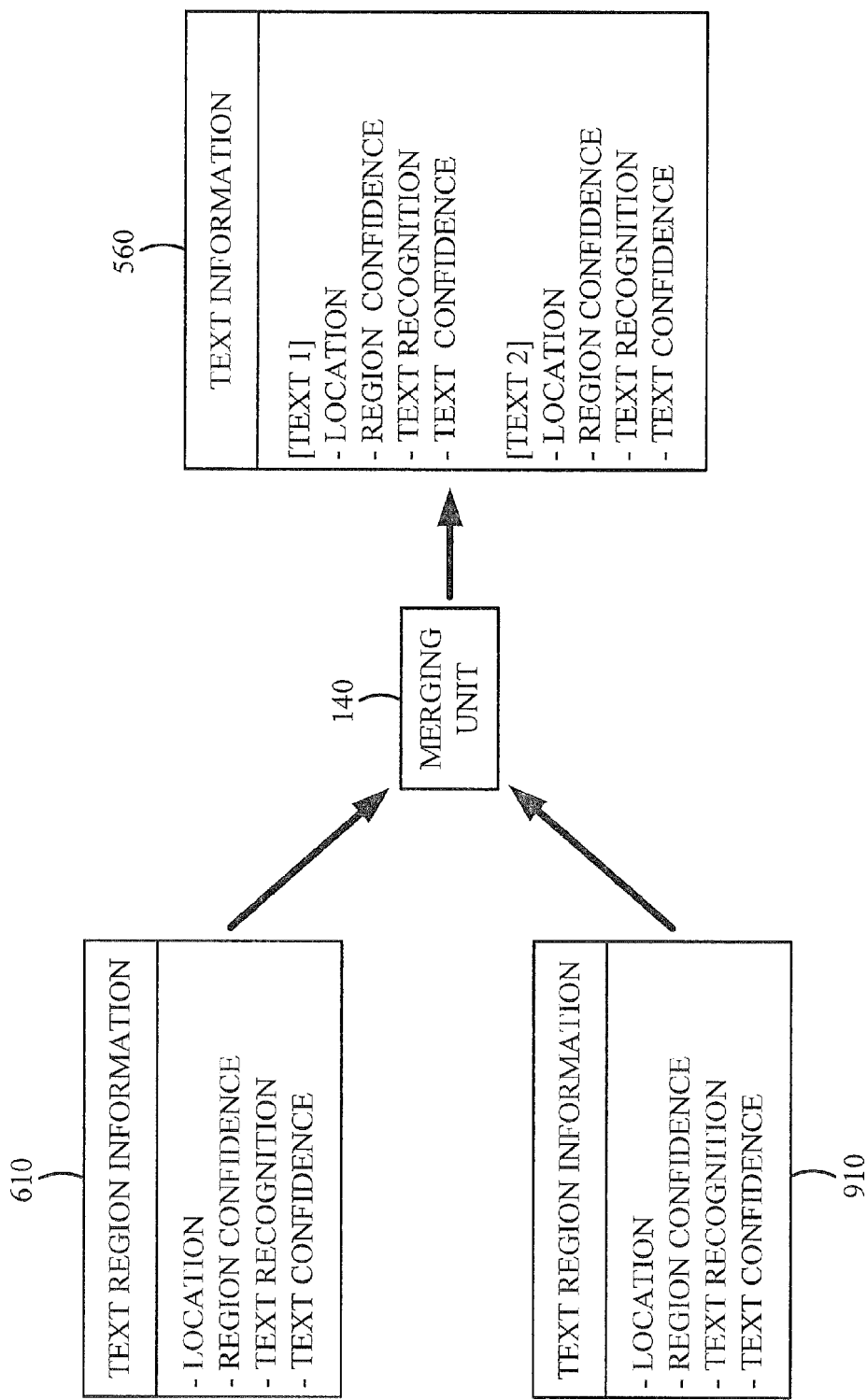
FIG. 10 illustrates an operation, performed by a merging unit, of merging the text region information to generate the text information.

FIG. 10 illustrates an operation, performed by the merging unit 140, of merging the text region information 610 and 910 to generate the text information 560. The merging unit 140 receives the text region information 610 and 910 from the text region detectors 120 and 130, respectively, as described in FIGS. 6 and 9. The text region information 610 and 910 are then merged to generate the text information 560 for the multi-channel image 510. For example, since the multi-channel image 510 contains the two text regions 530 and 550, the text information 560 can have two subsets of text information denoted as "TEXT 1" and "TEXT 2." Specifically, the text information of "TEXT 1" includes information from the text region information 610 such as the location information, region confidence information, text recognition information, and text confidence information in FIG. 6. Similarly, the text information of "TEXT 2" includes information from the text region information 910 such as the location information, region confidence information, text recognition information, and text confidence information in FIG. 9. According to the design and requirements of the image processing apparatus 100, the text information 560 may include other information in addition to the above described information, e.g., metadata associated with the multi-channel image 510. Additionally or alternatively, the text information 560 may omit some of the above described information, e.g., region confidence information, In another embodiment, text recognition of the identified text regions 530 and 550 is performed in the merging unit 140, instead of the text region detectors 120 and 130. In this case, the merging unit 140 receives and merges text region information without text recognition information and text confidence information from the text region detectors 120 and 130 to generate the text information 560 for the multi-channel image 510. Similar to the merging operation described in the above embodiment, the merging unit 140 generates text information 560 including two subsets, "TEXT 1" and "TEXT 2," respectively for the text region information 610 and 910. Each subset includes the associated location information and region confidence information from the text region information 610 or 910. In addition, based on the location information of the text region information received from the text region detector 120, the merging unit 140 recognizes a text in a region of the grayscale image 520 defined by the location information, and determines the text confidence value of the recognized text. Similarly, based on the location information of the text region information received from the text region detector 130, the merging unit 140 recognizes a text in a region of the grayscale image 540 defined by the location information, and determines the text confidence value of the recognized text. Then, the recognized texts from the grayscale images 520 and 540 and their text confidence values are added to the respective subsets of the text information 560, i.e., "TEXT 1" and "TEXT 2."

Figure 11:
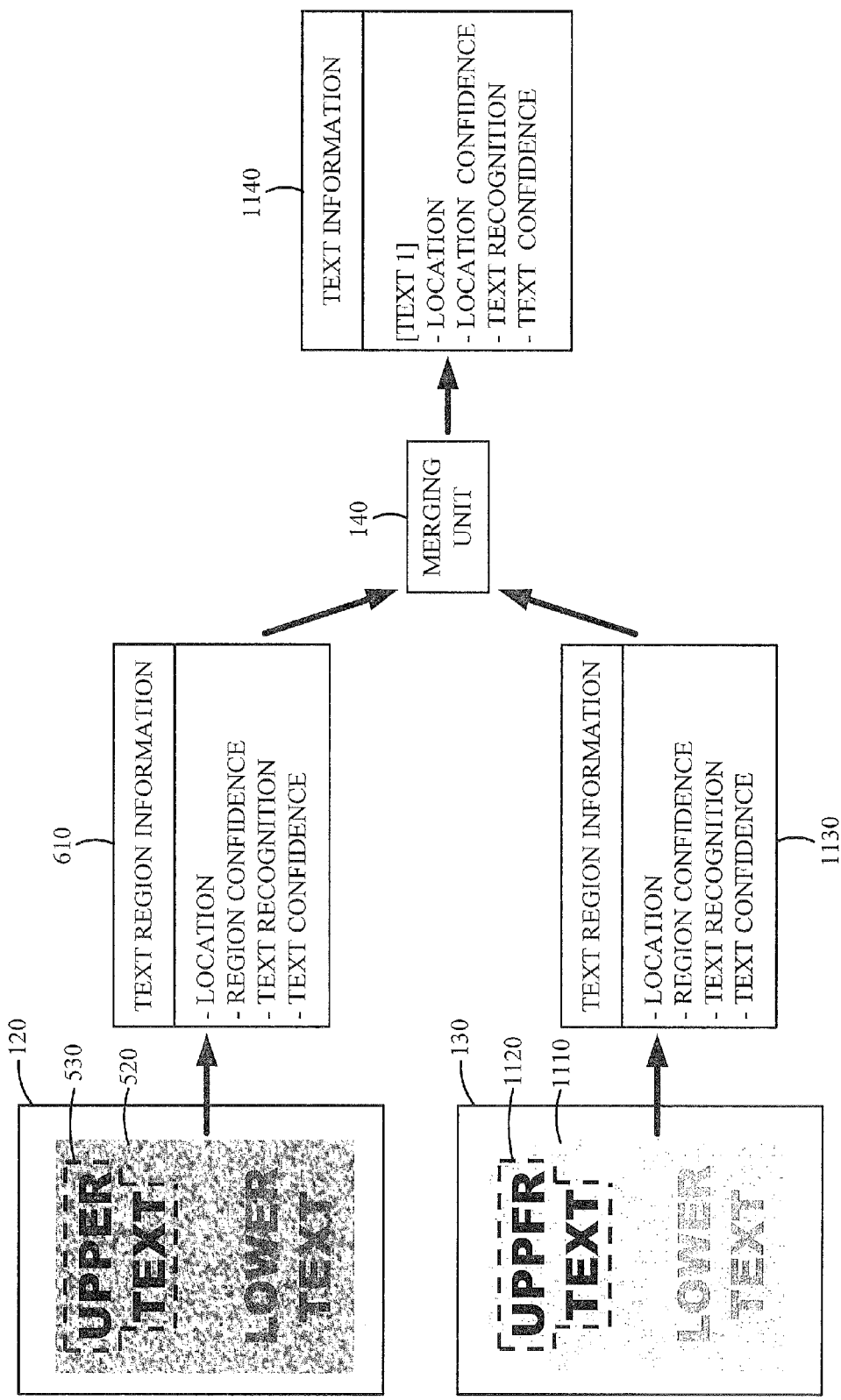
FIG. 11 illustrates a diagram of generating text information when two text regions identified in different grayscale images, respectively, overlap in location.

FIG. 11 illustrates a diagram of generating text information 1140 when text regions 530 and 1120 identified in different grayscale images 520 and 1110, respectively, overlap in location. In this embodiment, the text recognition operation on the text regions 530 and 1120 is performed in the text region detectors 120 and 130 to generate text region information 610 and 1130. Unlike the embodiments described in FIGS. 5, 6, 8, and 9, the text regions 530 and 1120 identified by the text region detectors 120 and 130 overlap each other. As such, the text region information generated by the text region detectors 120 and 130 may have identical location information with identical or different region confidence information, text recognition information, and text confidence information for both text regions 530 and 1120.

In the example of FIG. 11, the text region detector 120 recognizes the text, "UPPER TEXT," from the identified text region 530. The text region detector 120 further determines a text confidence value for the recognized text, which may be a numeric value, for example, 0.9. Likewise, the text region detector 130 recognizes the text, "UPPFR TEXT," from the identified text region 1120 and determines a text confidence value for the recognized text, for example, 0.8. Based on the above text region information 610 and 1130, the merging unit 140 determines that the text regions 530 and 1120 overlap each other but the recognized texts "UPPER TEXT" and "UPPFR TEXT" are different. In this case, the merging unit 140 determines which of the recognized texts is more accurate based on their text confidence values. For example, since "UPPER TEXT" with the text confidence value of 0.9 has a higher confidence value than "UPPFR TEXT" with the text confidence value of 0.8, the merging unit 140 selects the text region information 610 associated with "UPPER TEXT" to generate the text information 1140 for the multi-channel image 510. Although the two text regions 530 and 1120 overlap each other in this example, three or more text regions may overlap each other and then the merging unit 140 will select text region information corresponding to the highest text confidence value among the associated text confidence values.

According to another embodiment, the text regions may overlap only in part. The merging unit 140 selects one of the text regions with the highest text confidence value to generate a part of text information of the multi-channel image. In addition, the merging unit 140 determines non-overlapping portions in the other text regions and adds the text region information associated with the non-overlapping portions to the partially generated text information to generate the text information for the multi-channel image. The text confidence information for the text information may be selected from any of the text region information associated with the text regions or weighted according to appropriate contribution of each text region.

Figure 12:
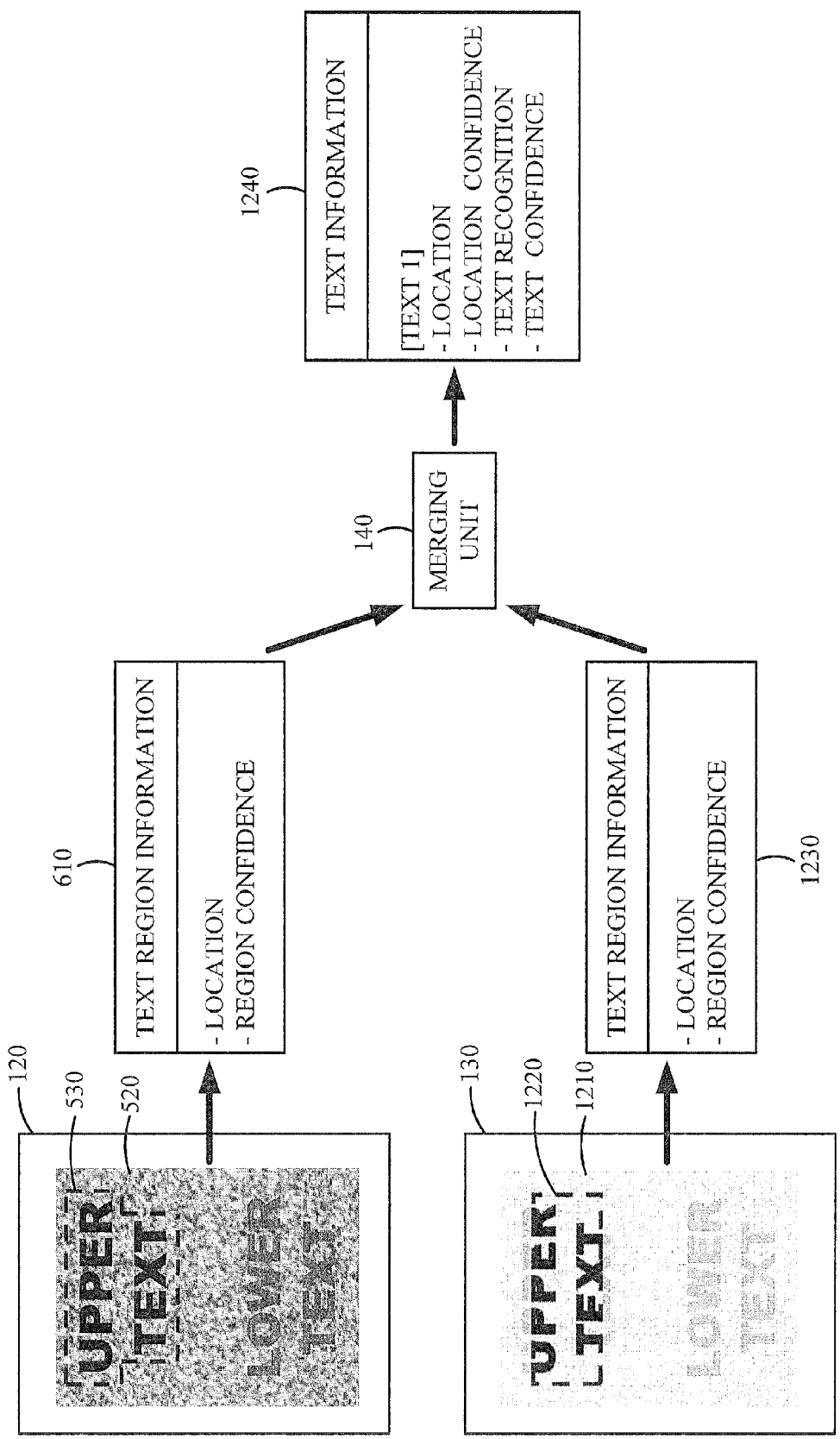
FIG. 12 illustrates another diagram of generating text information when two text regions identified in different grayscale images, respectively, overlap in location.

FIG. 12 illustrates another diagram, performed by the merging unit 140, of generating text information 1240 when text regions 530 and 1220 identified in different grayscale images 520 and 1210, respectively, overlap in location. In this embodiment, the text recognition operation on the text regions 530 and 1220 is performed in the merging unit 140, instead of the text region detectors 120 and 130. The text region detector 120 identifies the text region 530 in the grayscale image 520. Similarly, the text region detector 130 identifies a text region 1220 in the other grayscale image 1210. As shown in FIG. 12, since the text regions 530 and 1220 identified by the text region detectors 120 and 130 overlap each other in part, the text region information generated by the text region detectors 120 and 130 include different location information. The text region detector 120 further determines a region confidence value for the identified text region 530, which may be a numeric value, for example, 0.9. Likewise, the text region detector 130 determines a region confidence value for the identified text region 1220, for example, 0.5. The text region detectors 120 and 130 then generate and output the text region information 610 and 1230 respectively including the associated location information and region confidence information.

Based on the text region information 610 and 1230 respectively received from the text region detectors 120 and 130, the merging unit 140 performs a merging operation. In the merging operation, the merging unit 140 determines that the text regions 530 and 1220 overlap each other in part based on the location information of the text regions 530 and 1220 included in the text region information 610 and 1230. In this case, the merging unit 140 determines which of the identified text regions is more accurate based on their region confidence values. For example, since the text region 530 with the region confidence value of 0.9 has a higher confidence value than the text region 1220 with the region confidence value of 0.5, the merging unit 140 selects the text region information 610. The merging unit 140 then recognizes a text in a region in the grayscale image 520 defined by the location information of the selected text region information 610. Although the two text regions 530 and 1220 overlap in this example, three or more text regions may overlap and then the merging unit 140 will select text region information corresponding to the highest region confidence value among the associated region confidence values. Thus, according to the above embodiments of the present disclosure, the text recognition accuracy for a multi-channel image can improve by merging text recognition results for multiple grayscale images extracted from the multi-channel image. Further, since the text recognition operations on the multiple grayscale images are performed in parallel, the overall processing time will not be increased in proportion to the number of grayscale images. Also, the overall processing time can be controlled to be not greater than the processing time required for the multi-channel image.

Figure 13:
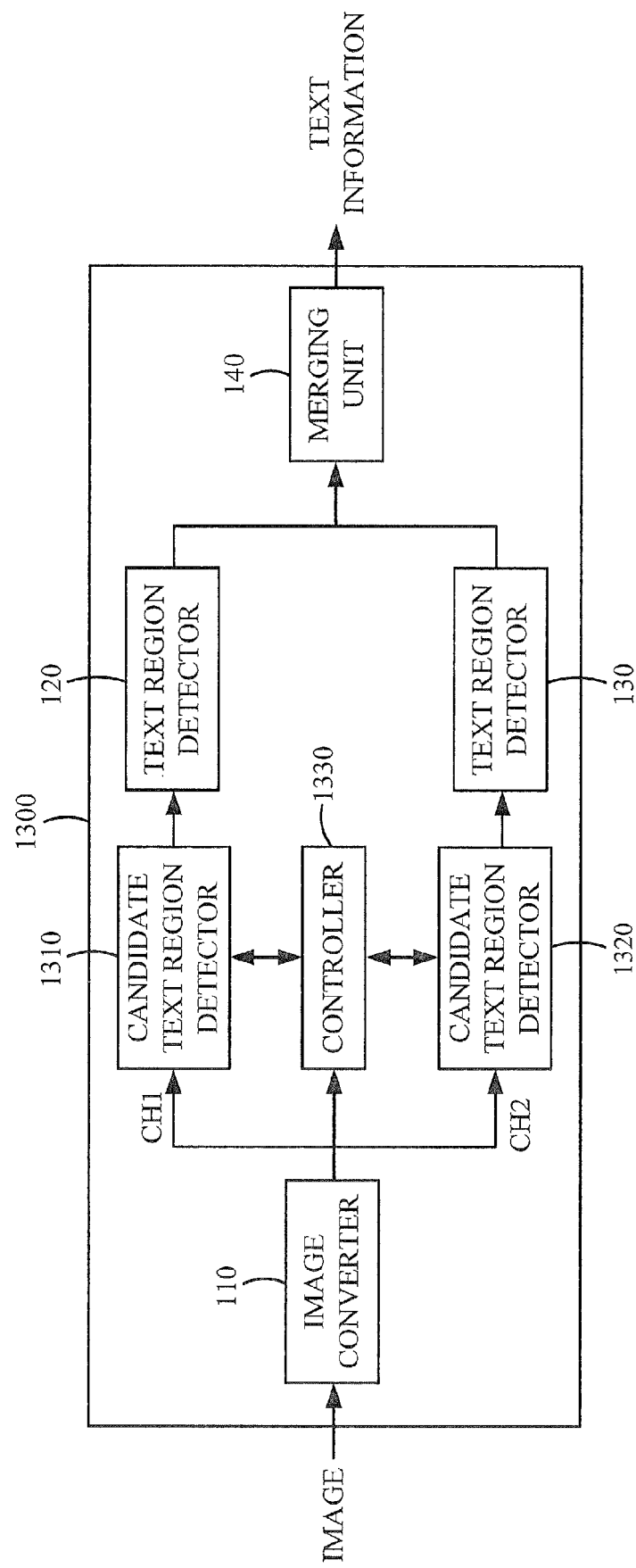
FIG. 13 illustrates an image processing apparatus configured to generate text information from an image by determining candidate text regions according to one embodiment of the present disclosure.

FIG. 13 illustrates an image processing apparatus 1300 configured to generate text information from an image by determining candidate text regions according to one embodiment of the present disclosure. The image processing apparatus 1300 includes the image converter 110, the text region detectors 120 and 130, and the merging unit 140, which operate in the same manner as in the apparatus 100 shown in FIG. 1 above. The image processing apparatus 1300 further includes candidate text region detectors 1310 and 1320 configured to identify candidate text regions in grayscale images, and a controller 1330 configured to adjust the candidate text regions for preventing miss of text region information, which will be described later.

In the image processing apparatus 1300, the image converter 110 receives a multi-channel image and generates a pair of grayscale images, which is provided to the candidate text region detectors 1310 and 1320, respectively. The candidate text region detectors 1310 and 1320 are configured to identify one or more candidate text regions in the respective grayscale images. In each candidate text region detector, a region containing a text component and/or a text-like component in its received grayscale image is identified to be a candidate text region. Here, the text-like component refers to a component which is not composed of characters but patterns or objects that have similar characteristics as characters, so that they are likely to be erroneously recognized as characters. For example, such patterns or objects are formed of one or more vertical, horizontal, or inclined straight lines and/or curved lines, or combinations thereof. An example of the text-like component will be illustrated in FIG. 15. As will be described in more detail below, the operation of identifying a candidate text region may be performed in a more coarse or imprecise manner in terms of text recognition accuracy, in comparison with the operation of identifying a text region. However, the identification of a candidate text region can be performed in a considerably short time and does not require significant computing resources compared to the identification of a text region.

The candidate text region detectors 1310 and 1320 are further configured to determine candidate text region locators associated with the identified candidate text regions, respectively. For example, a candidate text region locator indicates the location of the associated candidate text region in a grayscale image and includes coordinates of vertices of the candidate text region.

If the candidate text region detector 1310 identifies two or more candidate text regions in a received grayscale image, the candidate text region detector 1310 determines and outputs candidate text region locators associated with all of the candidate text regions. On the other hand, if no candidate text region has been identified, the candidate text region detector 1310 may output a candidate text region locator indicating that the grayscale image has no identified candidate text region. The candidate text region detector 1320 operates in a similar manner to the candidate text region detector 1310.

The text region detectors 120 and 130 receive the candidate text region locators from the candidate text region detectors 1310 and 1320, respectively. Based on the respective candidate text region locators, each of the text region detectors 120 and 130 accesses the candidate text region and determines text region information for the text region identified in the candidate text region. The text region information is then output from the text region detectors 120 and 130 to the merging unit 140, respectively. The merging unit 140 merges the text region information and generates text information for the multi-channel image.

In this embodiment, the candidate text region detector 1310 and the text region detector 120 define the processing channel CH1 and the candidate text region detector 1320 and the text region detector 130 define the other processing channel CH2. Thus, the operations through the processing channels CH1 and CH2 are performed in parallel. Although FIG. 13 illustrates identifying candidate text regions through two processing channels, the image processing apparatus 1300 may be configured with any suitable number of processing channels including candidate text region detectors and text region detectors. The above described units in the image processing apparatus 1300 may be implemented by hardware, software executed by one or more processors of computing device and system, and/or the combination thereof.

Figure 14:
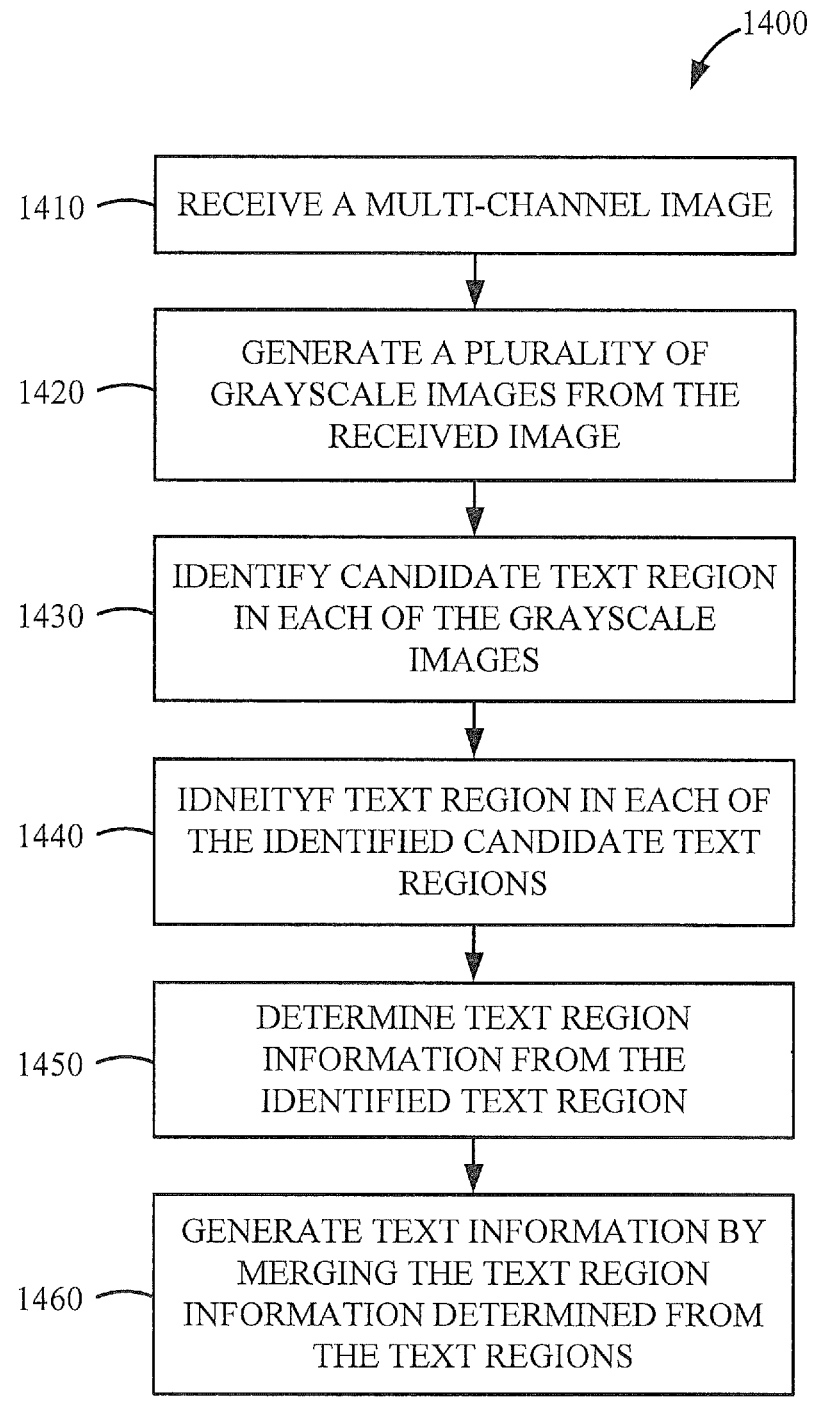
FIG. 14 represents a flowchart of a method, performed by an image processing apparatus, for receiving an image and generating text information from the received image by identifying candidate text regions according to one embodiment of the present disclosure.

FIG. 14 represents a flowchart of a method 1400, performed by the image processing apparatus 1300, for receiving an image and generating text information based on identified candidate text regions. First, the image converter 110 receives a multi-channel image, at 1410. The image converter 110 then generates a plurality of different grayscale images by using a variety of image conversion methods, at 1420. The generated grayscale images are input to the candidate text region detectors 1310 and 1320, respectively, and each of the candidate text region detectors 1310 and 1320 identifies a candidate text region in the received grayscale image, at 1430. Further, the candidate text region detectors 1310 and 1320 determine candidate text region locators that identify the locations of the respective candidate text regions. Using the respective candidate text region locators, each of the text region detectors 120 and 130 then identifies a text region from the associated candidate text region, at 1440. The text region detectors 120 and 130 further determine text region information of the respective identified text regions, at 1450. The merging unit 140 receives the text region information from the text region detectors 120 and 130 and generates text information by merging the received text region information, at 1460.

Figure 15:
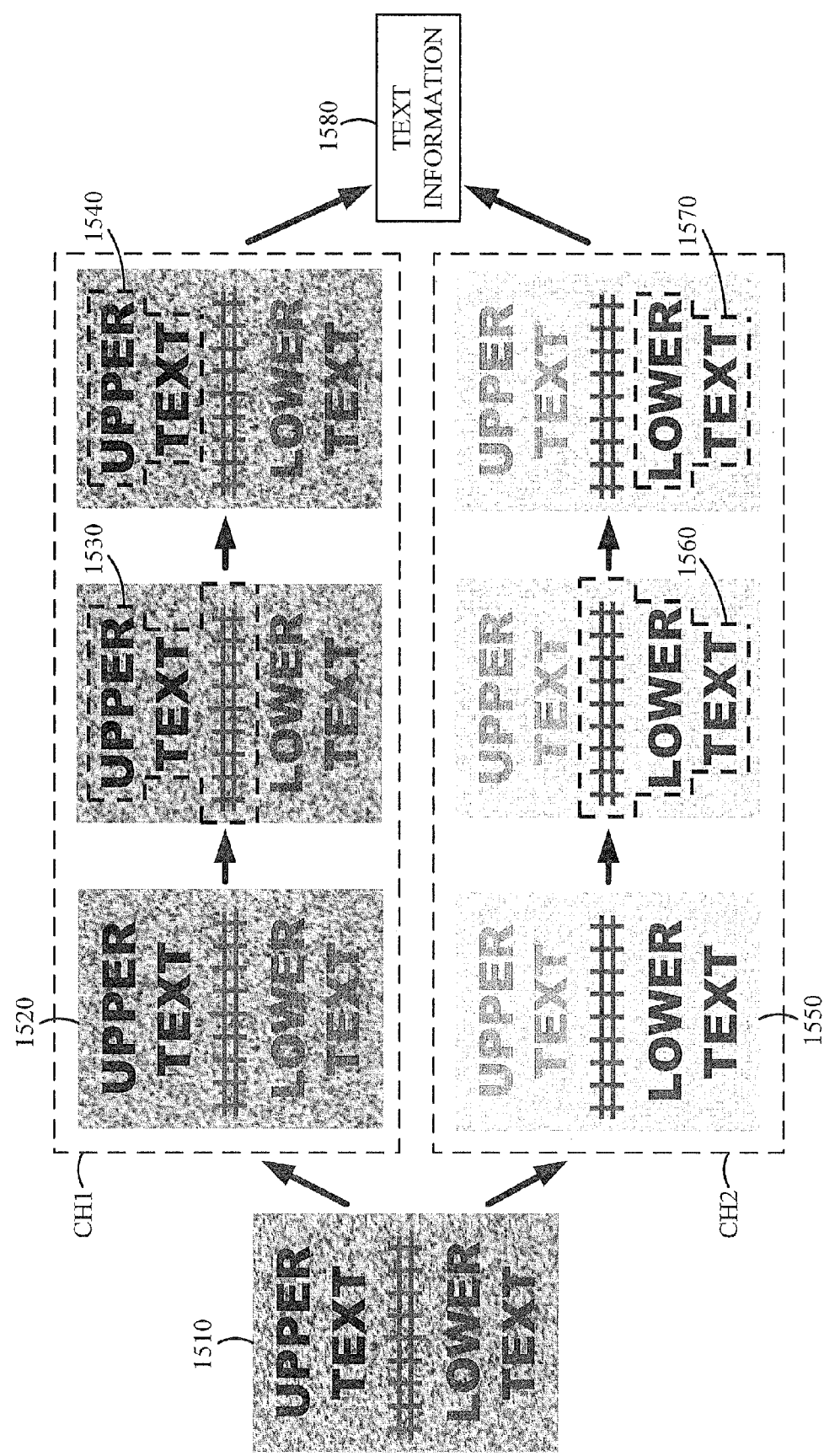
FIG. 15 is a diagram of generating text information from a multi-channel image using processing channels arranged in parallel according to one embodiment of the present disclosure.

FIG. 15 is a diagram of generating text information 1580 from a multi-channel image 1510 including a text-like component, using the processing channels CH1 and CH2 arranged in parallel in accordance with one embodiment of the present disclosure. The multi-channel image 1510 includes two text portions, one in the upper portion ("UPPER TEXT") and the other in the lower portion ("LOWER TEXT"). The image 1510 further includes a pattern in the middle portion, which appears to be composed of a series of "#"s and can be referred to as a text-like component as described above. The multi-channel image 1510 is converted into two different grayscale images 1520 and 1550 for the processing channels CH1 and CH2, respectively, by using different image conversion methods. In the converted grayscale image 1520, the text in the upper portion "UPPER TEXT" and the pattern in the middle portion remain distinctive while the text in the lower portion "LOWER TEXT" is not readily distinguishable from the background. In contrast, in the converted grayscale image 1550, the text in the lower portion "LOWER TEXT" and the pattern in the middle portion appear more distinctive while the text in the upper portion "UPPER TEXT" is not readily distinguishable from the background.

Upon receiving the grayscale image 1520, the candidate text region detector 1310 in the processing channel CH1 identifies a candidate text region 1530 containing "UPPER TEXT" and the pattern (or text-like component) in the image 1520. Likewise, the candidate text region detector 1320 in the processing channel CH2 identifies a candidate text region 1560 containing "LOWER TEXT" and the pattern in the image 1550. The candidate text region detectors 1310 and 1320 then determine candidate text region locators associated with the identified candidate text regions 1530 and 1560, respectively. The candidate text region locators indicate the locations of the candidate text regions 1530 and 1560 in the grayscale images 1520 and 1550, respectively.

Based on the candidate text region locator received from the candidate text region detector 1310, the text region detector 120 in the processing channel CH1 identifies a text region 1540 containing the text component "UPPER TEXT" in the candidate text region 1530. Likewise, based on the candidate text region locator received from the candidate text region detector 1320, the text region detector 130 in the processing channel CH2 identifies a text region 1570 containing the text component "LOWER TEXT" in the candidate text region 1560. Consequently, the pattern in the middle portion does not contain any text components but merely contains a text-like component, and is not identified as a text region. In addition, the text region detectors 120 and 130 determine and output text region information associated with the identified text regions 1540 and 1570, respectively. In identifying the text regions 1540 and 1570, the identification operation may be performed only on the candidate text regions 1530 and 1560, instead of the entire grayscale images 1520 and 1550. By performing the identification operation on only the identified candidate text regions 1530 and 1560, the area on which the identification operation is performed can be reduced substantially. Also, although the operation for identifying the candidate text regions 1530 and 1560 is additionally performed prior to identifying the text regions 1540 and 1570, the processing time required for such additional operation is insignificant compared to the entire processing time such that the entire processing time and required computing resources are reduced.

The text region information associated with text regions 1540 and 1570 is provided to the merging unit 140 from text region detectors 120 and 130 in the processing channels CH1 and CH2, respectively. The merging unit 140 then merges the text region information from the processing channels CH1 and CH2 to generate the text information 1580 for the multi-channel image 1510. The text information 1580 may include two subsets corresponding to the text regions 1540 and 1570, respectively, each subset of the text information 1580 including the location information, region confidence information, text recognition information, and text confidence information.

Figure 16:
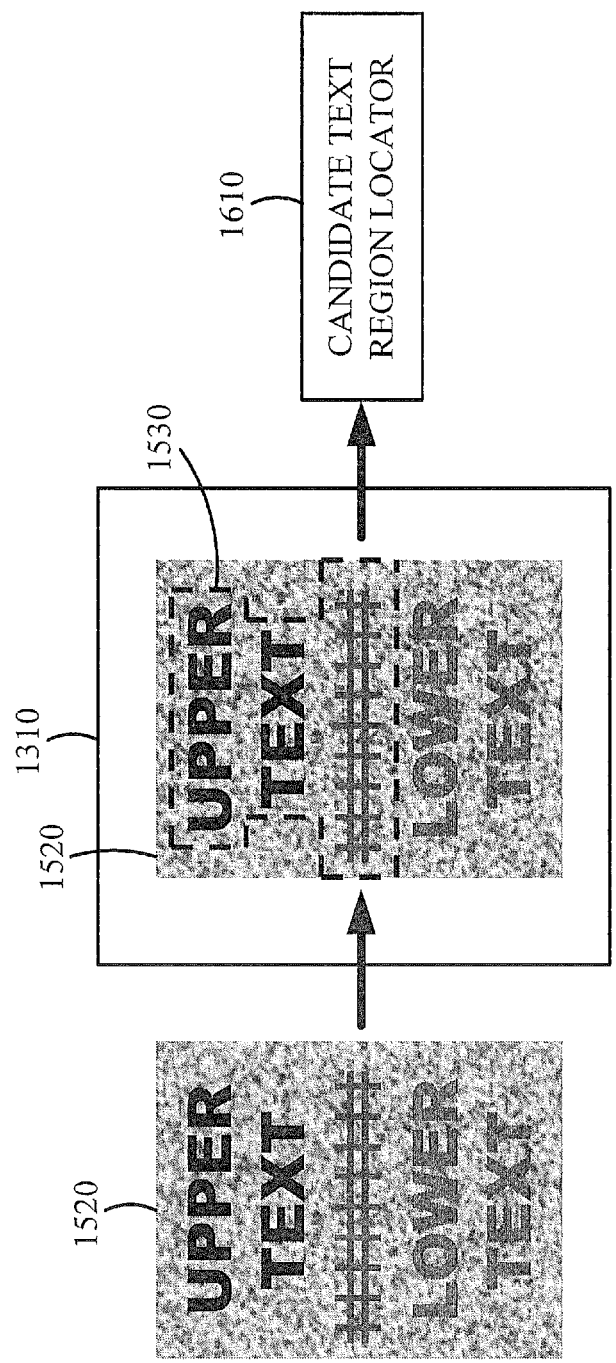
FIG. 16 illustrates a more detailed diagram of determining a candidate text region locator associated with a candidate text region for a processing channel.

FIG. 16 illustrates a more detailed diagram of determining a candidate text region locator 1610 associated with the candidate text region 1530 in the processing channel CH1. As set forth above, "UPPER TEXT" in the upper portion and the pattern in the middle portion of the grayscale image 1520 are distinctive from their background. In this case, "UPPER TEXT" corresponds to a text component and the pattern corresponds to a text-like component. Thus, as the candidate text region detector 1310 is configured not to distinguish a text component from a text-like component, the candidate text region detector 1310 determines that the candidate text region 1530 contains both the text component and text-like component.

In order to identify such a candidate text region, a scanning operation may be performed on a grayscale image to evaluate intensity variance in the grayscale image. Generally, a text component and/or a text-like component are distinct from its background and the intensity variance between the text component and/or text-like component and the background is relatively large in comparison to the background. Thus, when the grayscale image is scanned, for example, in a direction from the left side to the right side, first order derivatives (or gradient magnitude) between the intensity values of neighboring pixels are calculated, and the candidate text region includes a region where a large intensity variance may be observed. For example, in FIG. 16, the scanning operation would render the candidate text region 1530 having a high intensity variance between the background and both the "UPPER TEXT" in the upper portion and the pattern in the middle portion.

Once the candidate text region 1530 has been identified, the candidate text region detector 1310 determines the candidate text region locator 1610 associated with the candidate text region 1530. The candidate text region locator 1610 indicates the location of the candidate text region 1530 in the grayscale image 1520 and may include coordinates of vertices of the candidate text region 1530. The determined candidate text region locator 1610 will be provided to the merging unit 140.

Figure 17:
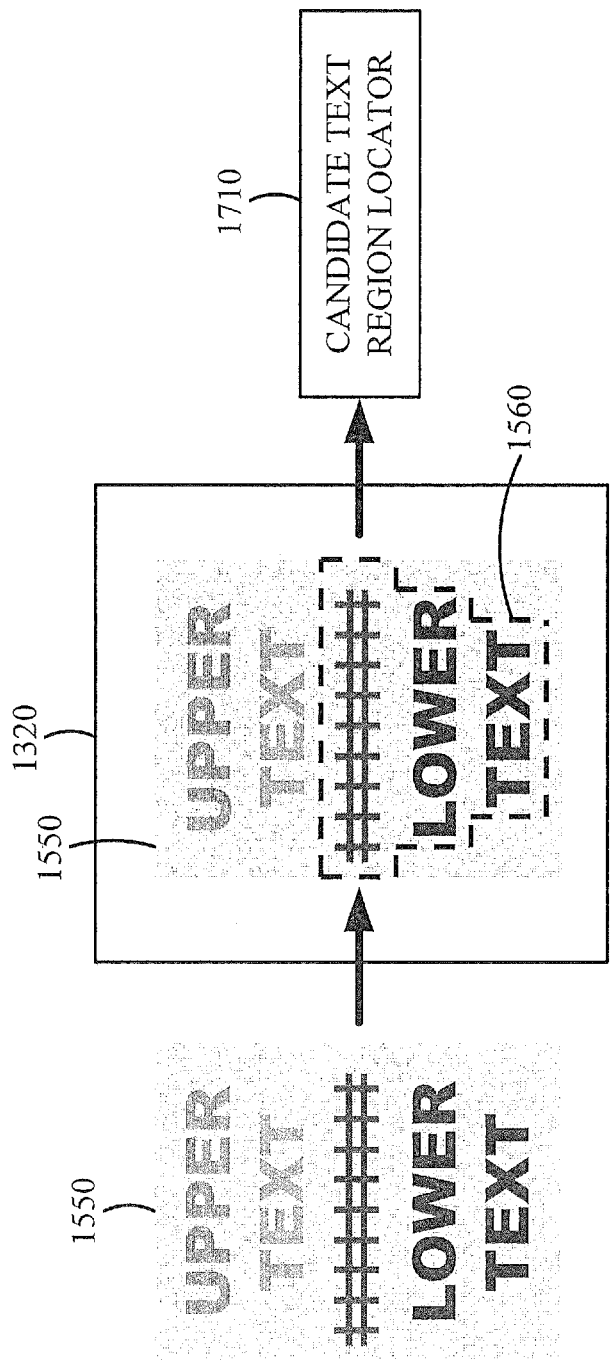
FIG. 17 illustrates a more detailed diagram of determining another candidate text region locator associated with another candidate text region for another processing channel.

FIG. 17 illustrates a more detailed diagram of determining a candidate text region locator 1710 associated with the candidate text region 1560 in the grayscale image 1550 in the processing channel CH2. In the same way as described with reference FIG. 16, the candidate text region detector 1320 identifies a region containing the text component, i.e., "LOWER TEXT" in the lower portion and the text-like component in the middle portion to be the candidate text region 1560. Then, the candidate text region detector 1320 determines and outputs the candidate text region locator 1710 associated with the candidate text region 1560. Like the above, the candidate text region locator 1710 indicates the location of the candidate text region 1560 in the grayscale image 1550 and will be provided to the merging unit 140.

Figure 18:
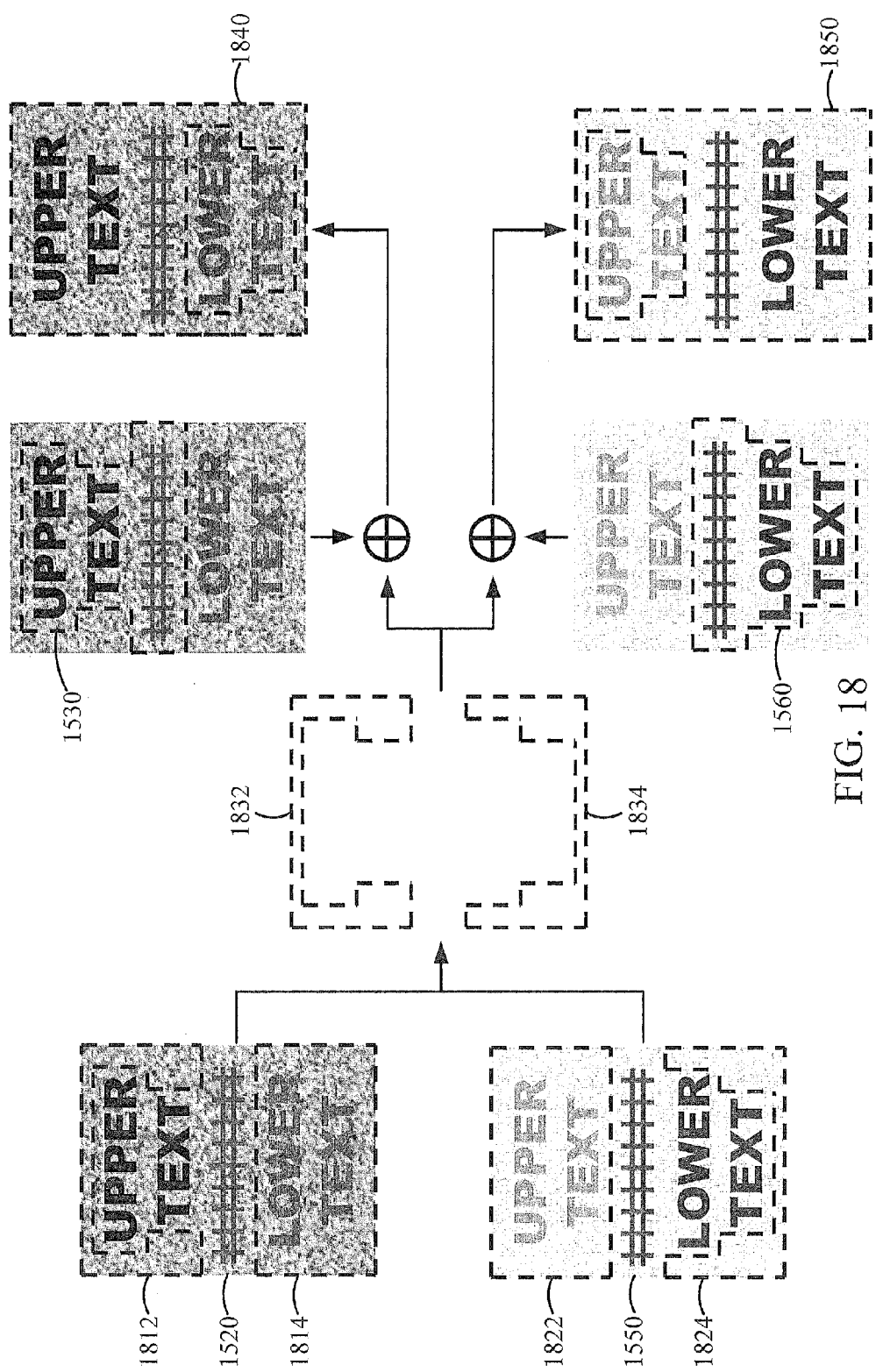
FIG. 18 illustrates an operation, performed by a controller, of adjusting candidate text regions by identifying a common portion of non-candidate text regions in grayscale images.

FIG. 18 illustrates an operation, performed by the controller 1330, of adjusting the candidate text regions 1530 and 1560 by identifying a common portion of non-candidate text regions in the grayscale images 1520 and 1550. The controller 1330 is configured to receive the candidate text region locators 1610 and 1710 associated with the candidate text regions 1530 and 1560 from the candidate text region detectors 1310 and 1320, respectively. Based on the received candidate text region locators 1610 and 1710 indicating the locations of the candidate text regions 1530 and 1560, the controller 1330 processes the grayscale images 1520 and 1550 to identify non-candidate text regions. The non-candidate text regions correspond to remaining regions in the images 1520 and 1550 other than the candidate text regions 1530 and 1560. Accordingly, such non-candidate text regions include neither text components nor text-like components. In the example illustrated by FIG. 18, the controller 1330 identifies non-candidate text regions 1812 and 1814 from the grayscale image 1520. Similarly, the controller 1330 also identifies non-candidate text regions 1822 and 1824 from the grayscale image 1550.

The controller 1330 compares the non-candidate text regions 1812 and 1814 with the non-candidate text regions 1822 and 1824 and identifies common portions 1832 and 1834, at which the non-candidate text regions from the grayscale images 1520 and 1550 overlap each other. The controller 1330 then adds the common portions 1832 and 1834 to the candidate text region 1530 to generate an adjusted candidate text region 1840. Likewise, the controller 1330 adds the common portions 1832 and 1834 to the candidate text region 1560 to generate the other adjusted candidate text region 1850. The controller 1330 further determines adjusted candidate text region locators associated with the adjusted candidate text regions 1840 and 1850. The adjusted candidate text region locators are provided to the text region detectors 120 and 130, respectively. Based on the adjusted candidate text region locators, the text region detectors 120 and 130 identify text regions in the adjusted candidate text regions 1840 and 1850 and determine associated text region information, respectively.

For some grayscale images, even if certain regions in the grayscale images contain text components and/or text-like components, both of the candidate text region detectors 1310 and 1320 may not mistakenly recognize such regions as candidate text regions. In this case, information associated with the certain regions containing the text components and/or text-like components will not be processed by any of the text region detectors 120 and 130, and the text recognition information regarding the regions will be lost. In the example of FIG. 18, if the common portions 1832 and 1834 contain text components and are erroneously discarded from the candidate text regions 1530 and 1560, the portions 1832 and 1834 will not be processed by any of the text region detectors 120 and 130. Thus, in order to prevent such loss of text recognition information, the controller 1330 identifies the common portions 1832 and 1834 and generates the adjusted candidate text regions 1840 and 1850 including the common portions 1832 and 1834 so that the text region detectors 120 and 130 can perform complete text region detection operations.

Figure 19:
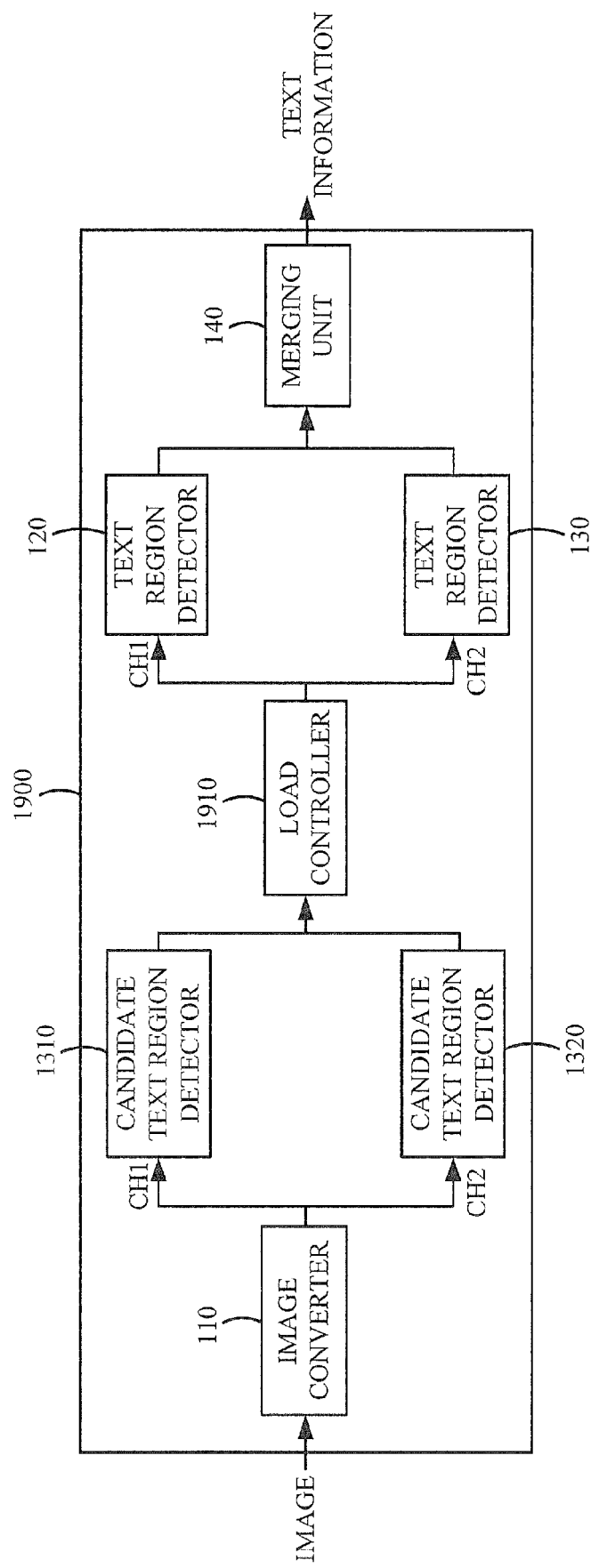
FIG. 19 illustrates an image processing apparatus configured to generate text information from an image by adjusting processing loads between processing channels according to one embodiment of the present disclosure.

FIG. 19 illustrates an image processing apparatus 1900 configured to generate text information from an image by adjusting processing loads between the processing channels CH1 and CH2 according to one embodiment of the present disclosure. The image processing apparatus 1900 includes the image converter 110, the candidate text region detectors 1310 and 1320, the text region detectors 120 and 130, and the merging unit 140, which operate in the same manner as in the apparatus 1300 shown in FIG. 13 above. The image processing apparatus 1900 further includes a load controller 1910 for adjusting processing loads between the processing channels CH1 and CH2.

In the image processing apparatus 1900, the image converter 110 receives a multi-channel image and generates a grayscale image for each of the candidate text region detectors 1310 and 1320. The candidate text region detectors 1310 and 1320 identify one or more candidate text regions in the respective grayscale images and determine candidate text region locators associated with the candidate text regions. The candidate text region detectors 1310 and 1320 provide the candidate text region locators to the load controller 1910, which estimates a processing load for each candidate text region based on the associated candidate text region locator. For example, a processing load for determining a text region from each candidate text region can be estimated based on the size of the candidate text region from the associated candidate text region locator. Based on the estimated processing loads, the load controller 1910 adjusts the sizes of the candidate text regions to generate load-balanced candidate text regions as described in more detail below. In addition, the load controller 1910 newly determines candidate text region locators of the load-balanced candidate text regions. The newly determined candidate text region locators are then output to the text region detectors 120 and 130, respectively, in the parallel processing channels CH1 and CH2.

Based on the candidate text region locators from the load controller 1910, each of the text region detectors 120 and 130 accesses a load-balanced candidate text region and determines text region information for the text region identified in the load-balanced candidate text region. The text region information is then output from the text region detectors 120 and 130 to the merging unit 140. The merging unit 140 merges information associated with the text regions identified by the text region detectors 120 and 130 and generates text information for the multi-channel image.

In the image processing apparatus 1900, the candidate text region detector 1310 and the text region detector 120 define the processing channel CH1, while the candidate text region detector 1320 and the text region detector 130 define the other processing channel CH2. Thus, the operations of the processing channels CH1 and CH2 are performed in parallel. Although FIG. 19 illustrates balancing the processing loads between two processing channels, the image processing apparatus 1900 may be configured with any suitable number of processing channels including candidate text region detectors and text region detectors. The above described units in the image processing apparatus 1900 may be implemented by hardware, software executed by one or more processors of computing device and system, and/or the combination thereof.

Figure 20:
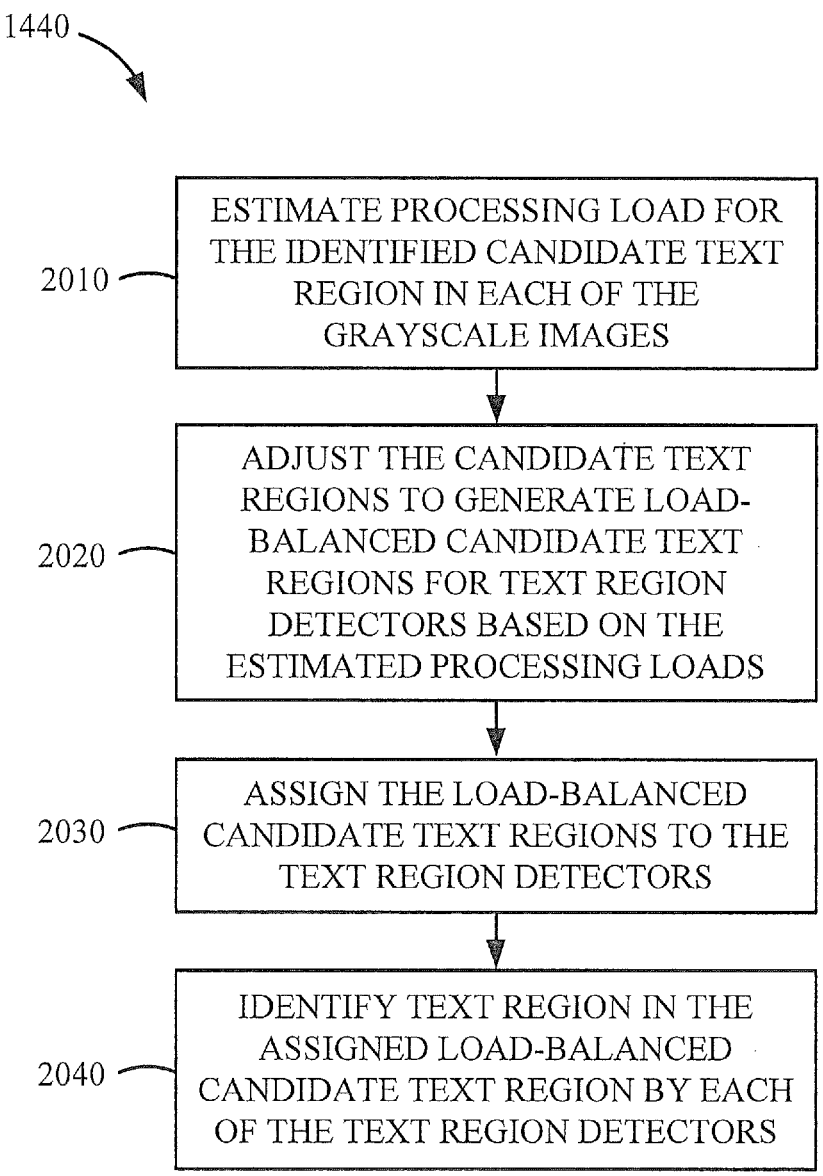
FIG. 20 represents a flowchart of a method, performed by an image processing apparatus, for identifying text regions in candidate text regions adjusted based on estimated processing loads according to one embodiment of the present disclosure.

FIG. 20 represents a flowchart of a method, performed by the image processing apparatus 1900, for identifying text regions in candidate text regions adjusted based on estimated processing loads. The operations of FIG. 20 may be sub-operations of the operation 1440 of FIG. 14 for identifying text regions. Upon receiving the candidate text region locators from the candidate text region detectors 1310 and 1320, the load controller 1910 estimates a processing load for each of the candidate text regions, at 2010. Once the processing loads for the candidate text regions are estimated, the load controller 1910 adjusts the candidate text regions to generate load-balanced candidate text regions for the processing channels CH1 and CH2, respectively, based on the estimated processing loads, at 2020. The load controller 1910 then newly determines candidate text region locators of the load-balanced candidate text regions. The load-balanced candidate text regions are assigned to text region detectors 120 and 130 for processing, respectively, at 2030. The newly determined candidate text region locators are then output to the text region detectors 120 and 130, respectively, in the parallel processing channels CH1 and CH2. The text region detectors 120 and 130 then identify text regions in their respective assigned load-balanced candidate text regions, at 2040.

Figure 21:
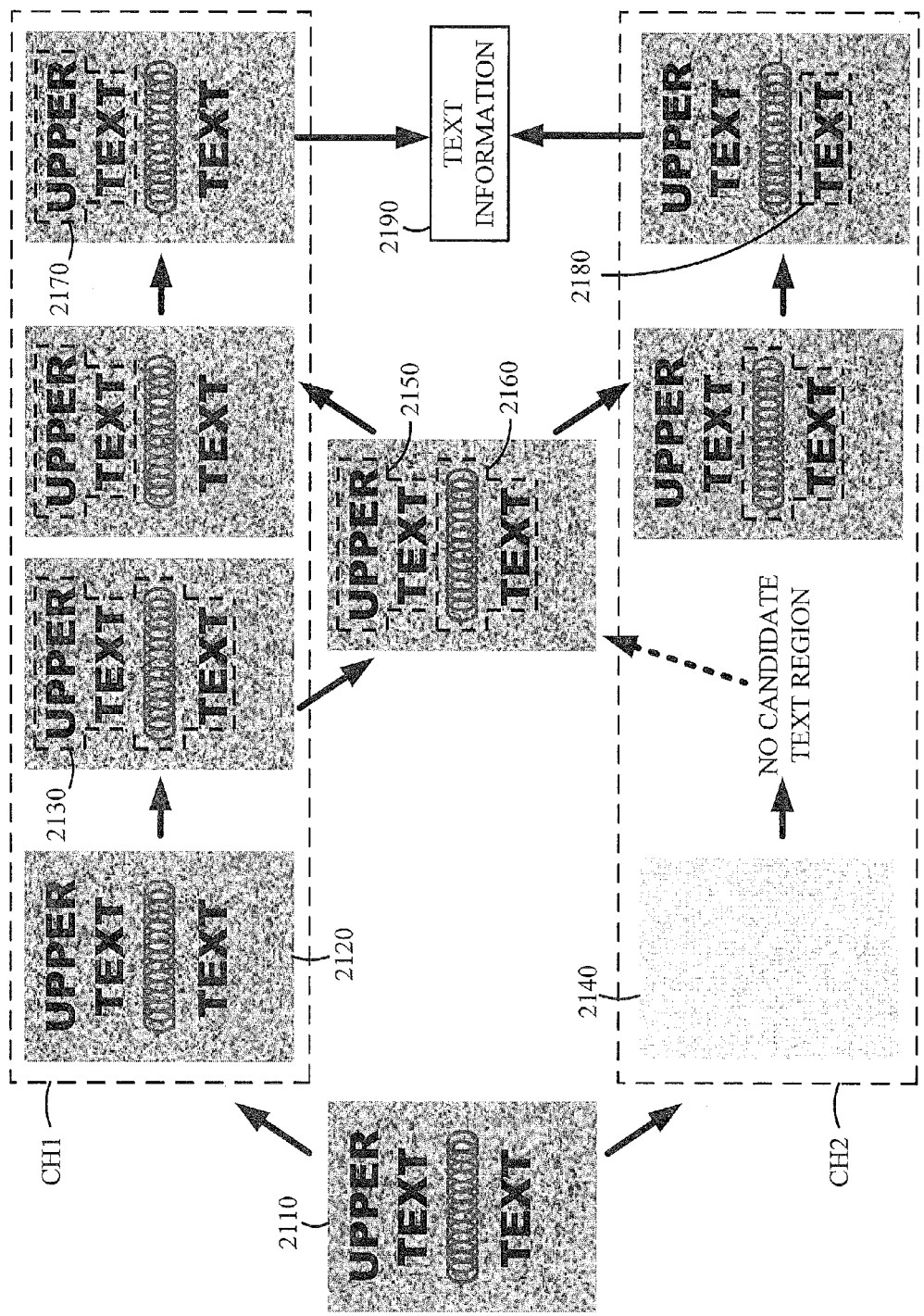
FIG. 21 is a diagram of generating text information from a multi-channel image using processing channels arranged in parallel and a load controller for load-balancing between the processing channels.

FIG. 21 is a diagram of generating text information 2190 from a multi-channel image 2110 using the processing channels CH1 and CH2 arranged in parallel and the load controller 1910 for load-balancing between the processing channels CH1 and CH2. The multi-channel image 2110 includes two text components, one in the upper portion ("UPPER TEXT") and the other in the lower portion ("TEXT"). The image 2110 further includes a text-like component in the middle portion, which appears to be composed of a series of overlapping "O"s. The multi-channel image 2110 is converted into two different grayscale images 2120 and 2140 for the processing channels CH1 and CH2, respectively, by using different image conversion methods. In the converted grayscale image 2120, the text components "UPPER TEXT" and "TEXT" and the text-like component are all distinctive from the background. In contrast, in the converted grayscale image 2140, no distinct component is found from the background.

Upon receiving the grayscale image 2120, the candidate text region detector 1310 in the processing channel CH1 processes the image 2120 to identify a candidate text region 2130 containing all of the text components and text-like component in the image 2120. In addition, the candidate text region detector 1310 determines that a candidate text region locator for the candidate text region 2130 indicates the location of the identified candidate text region 2130 in the grayscale image 2120. On the other hand, the candidate text region detector 1320 in the processing channel CH2 processes the grayscale image 2140 and fails to identify any candidate text region. Accordingly, the candidate text region detector 1320 determines that a candidate text region locator for the grayscale image 2140 indicates that there is no identified candidate text region in the grayscale image 2140.

The candidate text region locators are provided to the load controller 1910 from the candidate text region detectors 1310 and 1320. Based on the candidate text region locator received from the candidate text region detector 1310, the load controller 1910 estimates the size of the candidate text region 2130 and the corresponding processing load for the processing channel CH1. On the other hand, based on the candidate text region locator received from the candidate text region detector 1320, the load controller 1910 determines that a processing load for the processing channel CH2 is zero.

To balance processing loads between the processing channels CH1 and CH2, the load controller 1910 adjusts the candidate text region 2130 based on the estimated processing loads. For example, as shown in FIG. 21, as the grayscale image 2140 in the processing channel CH2 does not include any identified candidate text region, the processing load in the processing channel CH1 is larger than that in the processing channel CH2. Thus, the load controller 1910 reduces the processing load in the processing channel CH1 by partitioning the candidate text region 2130 into load-balanced candidate text regions 2150 and 2160. In addition, the load controller 1910 newly determines candidate text region locators associated with the load-balanced candidate text regions 2150 and 2160, respectively. Then, the load controller 1910 assigns the newly determined candidate text region locators to the processing channels CH1 and CH2, respectively. Specifically, the text region detector 120 of the processing channel CH1 receives the load-balanced candidate text region locator associated with the load-balanced candidate text region 2150 and identifies a text region 2170 in the region 2150. Similarly, the text region detector 130 of the processing channel CH2 receives the candidate text region locator associated with the load-balanced candidate text region 2160 and identifies a text region 2180 in the region 2160. In addition, the text region detectors 120 and 130 determines and output text region information associated with the text regions 2170 and 2180 to the merging unit 140, respectively. In the merging unit 140, text information 2190 is generated by merging the determined text region information.

Figure 22:
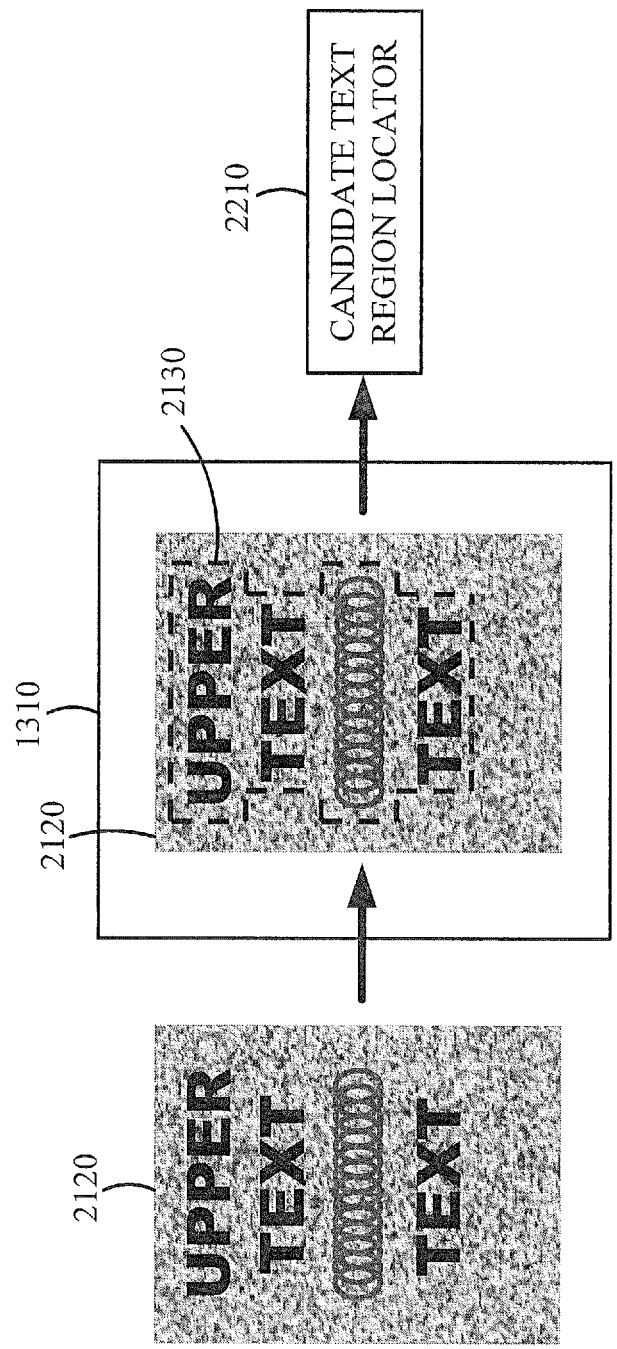
FIG. 22 illustrates a more detailed diagram of determining a candidate text region locator associated with a candidate text region for a processing channel.

FIG. 22 illustrates a more detailed diagram of determining a candidate text region locator 2210 associated with the candidate text region 2130 for the processing channel CH1. The grayscale image 2120 contains the text components "UPPER TEXT" and "TEXT," and a text-like component in the middle portion. The candidate text region detector 1310 identifies a region surrounding the text components and text-like component to be the candidate text region 2130. The candidate text region detector 1310 then determines the candidate text region locator 2210 indicating the location information of the identified candidate text region 2130 in the grayscale image 2120.

Figure 23:
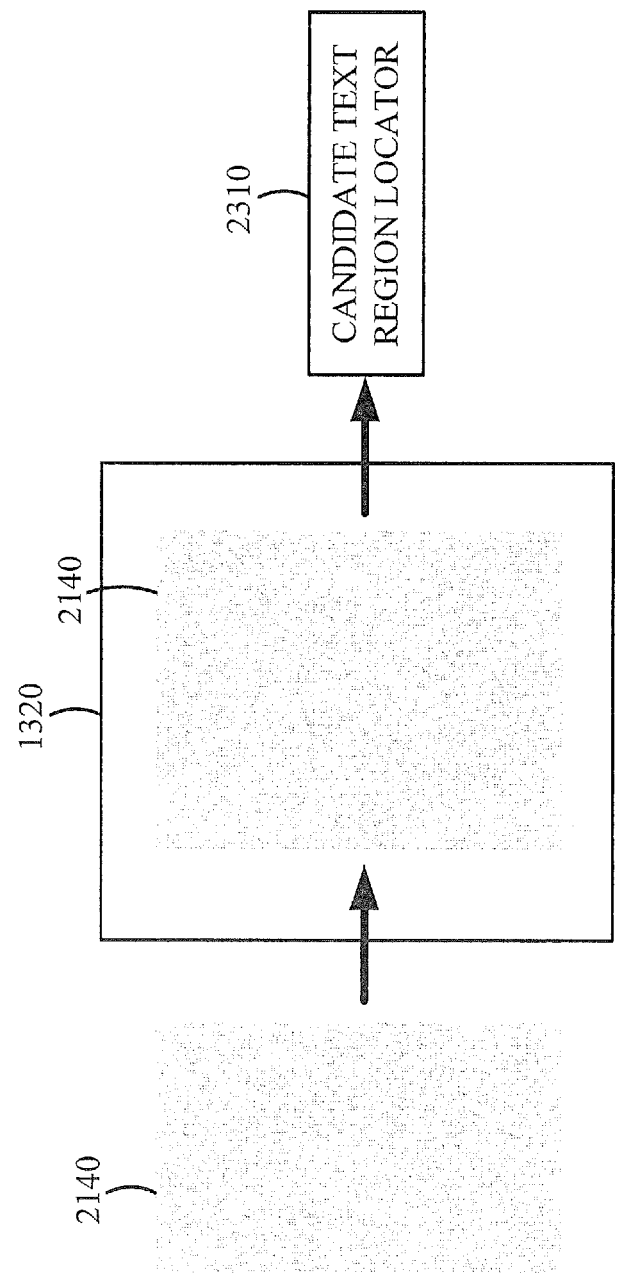
FIG. 23 illustrates a more detailed diagram of determining another candidate text region locator for another processing channel.

FIG. 23 illustrates a more detailed diagram of determining a candidate text region locator 2310 for the processing channel CH2. In contrary to the grayscale image 2120, the grayscale image 2140 contains neither text components nor text-like components. Accordingly, no region is determined to be a candidate text region from the grayscale image 2140. As a result, the candidate text region detectors 1320 determines the candidate text region locator 2310 indicating that there is no identified candidate text region in the grayscale image 2140.

Figure 24:
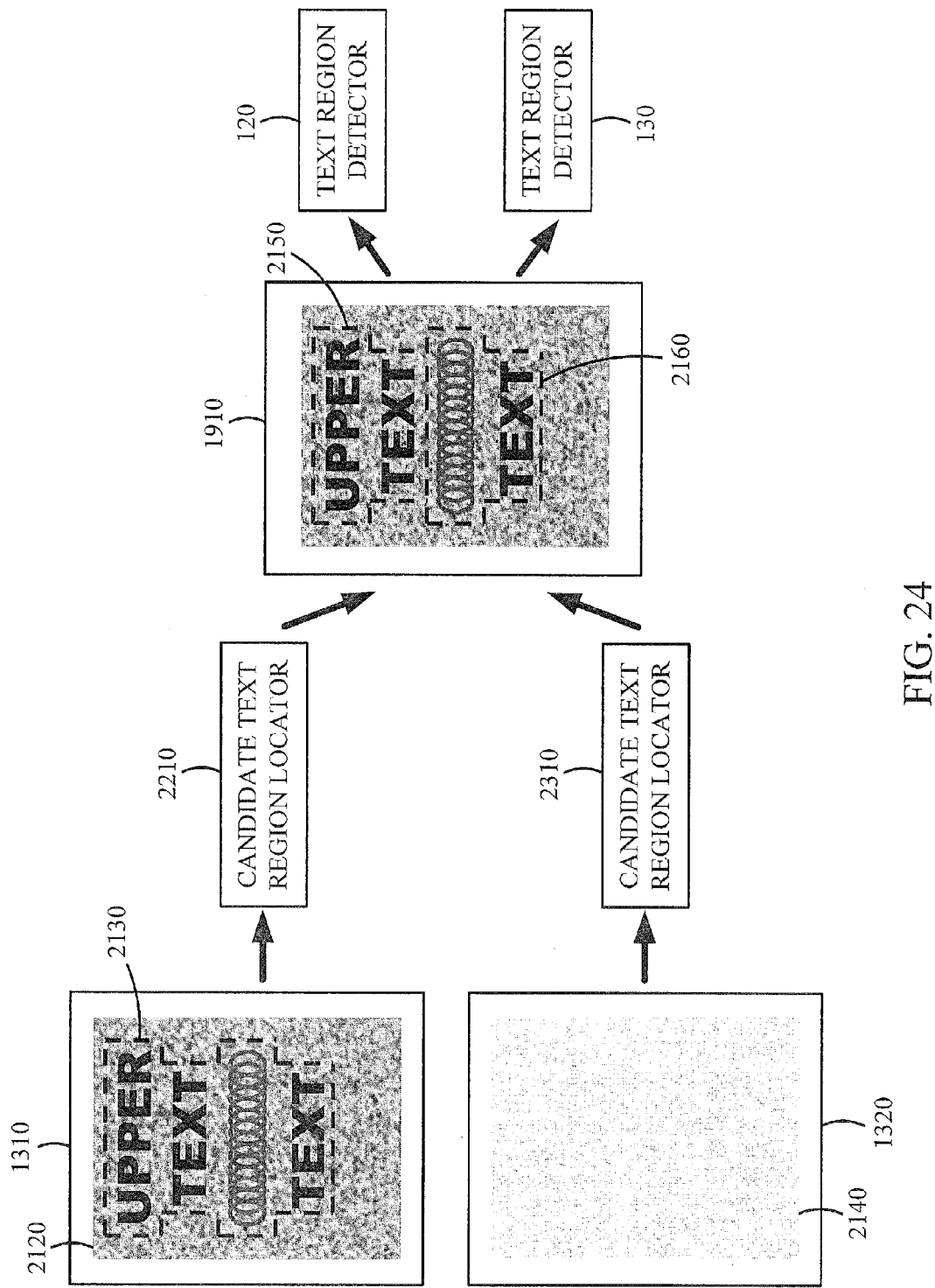
FIG. 24 illustrates a more detailed diagram of generating and assigning, by the load controller, load-balanced candidate text regions to text region detectors.

FIG. 24 illustrates a more detailed diagram of generating and assigning, by the load controller 1910, the load-balanced candidate text regions 2150 and 2160 to the text region detectors 120 and 130. As described in FIGS. 22 and 23 above, the candidate text region locators 2210 and 2310 are generated for the grayscale images 2120 and 2140, and provided to the load controller 1910. In the illustrated embodiment, the grayscale image 2120 has an identified candidate text region 2130 while the grayscale image 2140 has no identified candidate text region. Accordingly, the load controller 1910 estimates a processing load for the processing channel CH1 based on the size of the identified region 2130 and assigns a processing load of zero to the processing channel CH2. If, however, the grayscale image 2140 has an identified candidate text region, its processing load will also be estimated based on the size of the identified candidate text region.

In order to generate load-balanced candidate text regions for text region detectors 120 and 130, the load controller 1910 partitions the candidate text region 2130 having the larger processing load. For example, the load controller 1910 partitions the candidate text region 2130 to the two load-balanced candidate text regions 2150 and 2160 and determines candidate text region locators associated with the partitioned regions 2150 and 2160, respectively. Then, the candidate text region locator associated with the region 2150 is provided to the text region detector 120 in the processing channel CH1. Similarly, the candidate text region locator associated with the region 2160 is provided to the text region detector 130 in the processing channel CH2.

Figure 25:
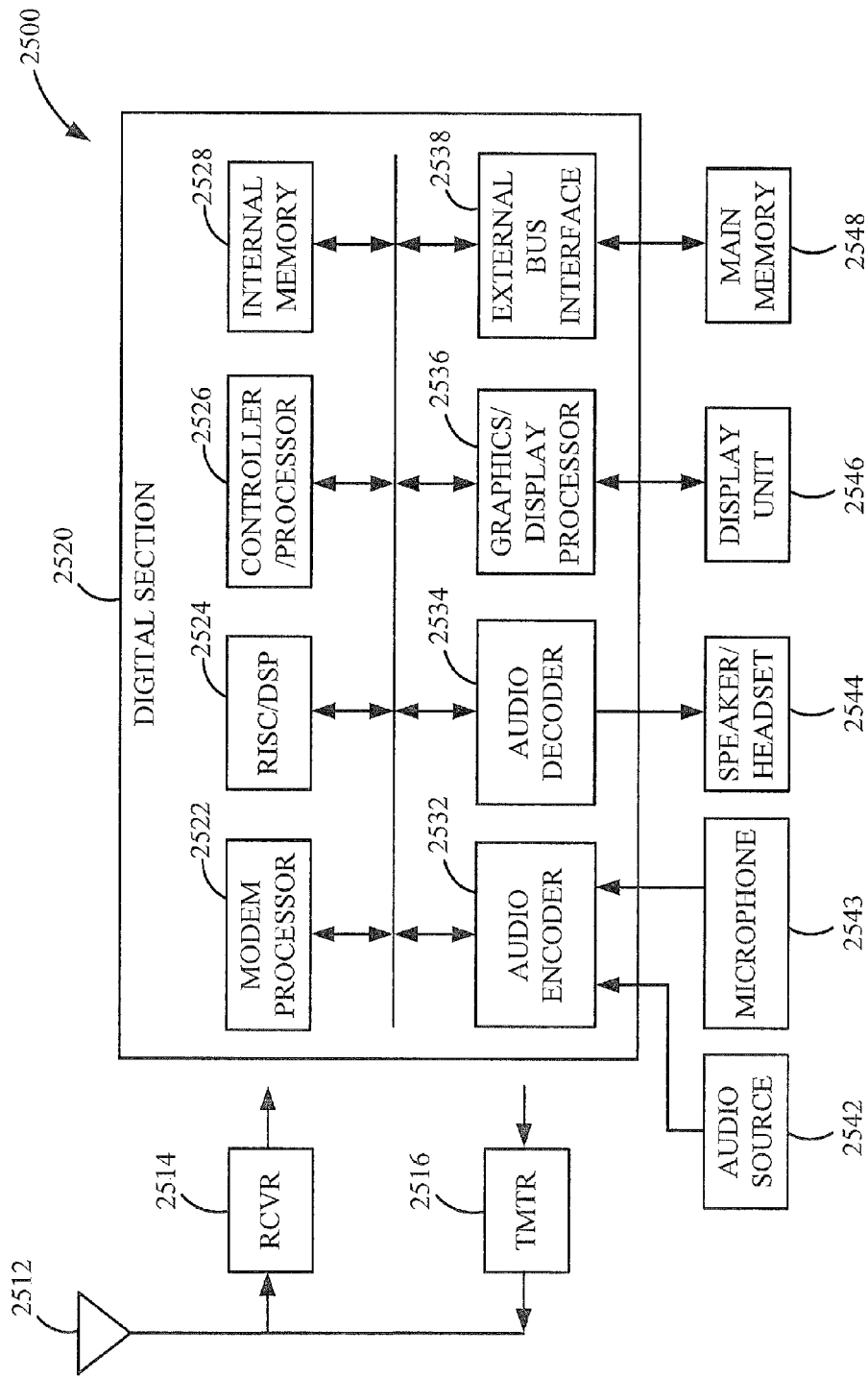
FIG. 25 is a block diagram of an exemplary mobile computing device in which the image processing apparatus and methods of the present disclosure may be implemented according to some embodiments of the present disclosure.

FIG. 25 is a block diagram of an exemplary mobile computing device 2500 in which the image processing apparatus and methods of the present disclosure may be implemented according to some embodiments of the present disclosure.

The configuration of the mobile computing device 2500 may be implemented in the image processing apparatus 100, 200, 300, 1300, and 1900. The mobile device 2500 may be a cellular phone, a terminal, a handset, a personal digital assistant (PDA), a wireless modem, a cordless phone, etc. The wireless communication system may be a Code Division Multiple Access (CDMA) system, a Global System for Mobile Communications (GSM) system, a Wideband CDMA (W-CDMA) system, a Long Term Evolution (LTE) system, a LTE Advanced system, etc. Further, the mobile device 2500 may communicate directly with another mobile device, for example, using Wi-Fi Direct, Bluetooth, or FlashLinq technology.

The mobile device 2500 is capable of providing bidirectional communication via a receive path and a transmit path. On the receive path, signals transmitted by base stations are received by an antenna 2512 and are provided to a receiver (RCVR) 2514. The receiver 2514 conditions and digitizes the received signal and provides the conditioned and digitized signal to a digital section 2520 for further processing. On the transmit path, a transmitter (TMTR) 2516 receives data to be transmitted from a digital section 2520, processes and conditions the data, and generates a modulated signal, which is transmitted via the antenna 2512 to the base stations. The receiver 2514 and the transmitter 2516 may be part of a transceiver that may support CDMA, GSM, W-CDMA, LTE, LTE Advanced, etc.

The digital section 2520 includes various processing, interface, and memory units such as a modem processor 2522, a reduced instruction set computer/digital signal processor (RISC/DSP) 2524, a controller/processor 2526, an internal memory 2528, a generalized audio encoder 2532, a generalized audio decoder 2534, a graphics/display processor 2536, and an external bus interface (EBI) 2538. The modem processor 2522 may process data transmission and reception, e.g., encoding, modulation, demodulation, and decoding. The RISC/DSP 2524 may perform general and specialized processing for the mobile device 2500. The controller/processor 2526 may control the operation of various processing and interface units within the digital section 2520. The internal memory 2528 may store data and/or instructions for various units within the digital section 2520.

The generalized audio encoder 2532 may perform encoding for input signals from an audio source 2542, a microphone 2543, etc. The generalized audio decoder 2534 may decode coded audio data and may provide decoded output signals to a speaker/headset 2544. It should be noted that the generalized audio encoder 2532 and the generalized audio decoder 2534 are not necessarily required for interface with the audio source, the microphone 2543 and the speaker/headset 2544, and thus may be omitted in the mobile device 2500. The graphics/display processor 2536 may process graphics, videos, images, and texts, which may be presented to a display unit 2546. The EBI 2538 may facilitate transfer of data between the digital section 2520 and a main memory 2548.

The digital section 2520 may be implemented with one or more processors, DSPs, microprocessors, RISCs, etc. The digital section 2520 may also be fabricated on one or more application specific integrated circuits (ASICs) and/or some other type of integrated circuits (ICs).

In general, any device described herein may represent various types of devices, such as a wireless phone, a cellular phone, a laptop computer, a wireless multimedia device, a wireless communication personal computer (PC) card, a PDA, an external or internal modem, a device that communicates through a wireless channel, etc. A device may have various names, such as access terminal (AT), access unit, subscriber unit, mobile station, mobile device, mobile unit, mobile phone, mobile, remote station, remote terminal, remote unit, user device, user equipment, handheld device, etc. Any device described herein may have a memory for storing instructions and data, as well as hardware, software, firmware, or combinations thereof.

The techniques described herein may be implemented by various means. For example, these techniques may be implemented in hardware, firmware, software, or a combination thereof. Those of ordinary skill in the art would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, the various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

For a hardware implementation, the processing units used to perform the techniques may be implemented within one or more ASICs, DSPs, digital signal processing devices (DSPDs), programmable logic devices (PLDs), field programmable gate arrays (FPGAs), processors, controllers, micro-controllers, microprocessors, electronic devices, other electronic units designed to perform the functions described herein, a computer, or a combination thereof.

Thus, the various illustrative logical blocks, modules, and circuits described in connection with the disclosures herein may be implemented or performed with a general-purpose processor, a DSP, an ASIC, a FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

For firmware and/or software implementations, the techniques may be embodied as instructions stored on a computer-readable medium, such as random access memory (RAM), read-only memory (ROM), non-volatile random access memory (NVRAM), programmable read-only memory (PROM), electrically erasable PROM (EEPROM), FLASH memory, compact disc (CD), magnetic or optical data storage device, etc. The instructions may be executable by one or more processors and may cause the processor(s) to perform certain aspects of the functionality described herein.

If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not as a limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, a server, or other remote source using a coaxial cable, fiber optic cable, twisted pair, digital subscriber line (DSL), or wireless technologies such as infrared, radio, and microwave, then the coaxial cable, the fiber optic cable, the twisted pair, the DSL, or wireless technologies such as infrared, radio, and microwave are included in the definition of medium. Disk and disc, as used herein, includes CD, laser disc, optical disc, digital versatile disc (DVD), floppy disk and blu-ray disc, where disks usually reproduce data magnetically, while discs reproduce data optically with lasers. Combinations of the above should also be included within the scope of computer-readable media.

A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. Alternatively, the storage medium may be integral to the processor. The processor and the storage medium may reside in an ASIC. The ASIC may reside in a user terminal. Alternatively, the processor and the storage medium may reside as discrete components in a user terminal.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples described herein but is to be accorded the widest scope consistent with the principles and novel features disclosed herein.

Although exemplary implementations may refer to utilizing aspects of the presently disclosed subject matter in the context of one or more stand-alone computer systems, the subject matter is not so limited, but rather may be implemented in connection with any computing environment, such as a network or distributed computing environment. Still further, aspects of the presently disclosed subject matter may be implemented in or across a plurality of processing chips or devices, and storage may similarly be effected across a plurality of devices. Such devices may include PCs, network servers, and handheld devices.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed:

1. A method of processing an image, the method comprising:
    generating a plurality of grayscale images from a multi-channel image, the plurality of grayscale images comprising a first grayscale image and a second grayscale image, the first grayscale image distinct from the second grayscale image;
    identifying at least one text region in the plurality of grayscale images;

determining text region information from the at least one text region; and generating text information of the multi-channel image based on the text region information.

2. The method of claim 1, wherein generating the text information of the multi-channel image includes, if two or more text regions including a first text region and a second text region of the at least one text region are identified in two or more of the plurality of grayscale images, merging first text region information from the first text region and second text region information from the second text region.

3. The method of claim 1, further comprising:
identifying one or more first homogenous regions in the first grayscale image; and
identifying a first candidate text region based on the one or more first homogenous regions.

4. The method of claim 1, wherein identifying the at least one text region includes:
identifying at least one candidate text region in the plurality of grayscale images; and
identifying the at least one text region in the identified at least one candidate text region.

5. The method of claim 1, wherein identifying the at least one text region includes:
identifying at least one non-candidate text region in the plurality of grayscale images;
if two or more non-candidate text regions of the at least one non-candidate text region are identified in two or more of the plurality of grayscale images, identifying a common portion of the two or more non-candidate text regions; and
adding the common portion to at least one candidate text region identified in the plurality of grayscale images.

6. The method of claim 1, wherein determining the text region information includes:
identifying a location for each region of the at least one text region;
recognizing text for each region of the at least one text region to determine a set of recognized text; and
in response to identifying that two or more text regions of the at least one text region are included in two or more of the plurality of grayscale images, determining a text confidence value for the recognized text in each text region of the two or more identified text regions.

7. The method of claim 6, wherein generating the text information of the multi-channel image includes, in response to determining that the identified locations of at least two of the two or more identified text regions overlap at least in part, selecting one recognized text of the set of recognized text from the at least two overlapping text regions as a selected text, wherein a particular text confidence value of the selected text is a highest value among the determined text confidence values.

8. The method of claim 1, wherein determining the text region information includes determining a region confidence value for each region of the at least one text region.

9. The method of claim 8, wherein determining the text region information of the multi-channel image further includes:
identifying a location for each region of the at least one text region;
in response to determining that two or more text regions of the at least one text region are included in two or more of the plurality of grayscale images and that the identified locations of at least two of the identified text regions overlap at least in part, selecting one text region of the at least two overlapping text regions as a selected text region, wherein a particular region confidence value of the selected text region is a highest value of the determined region confidence values; and
recognizing text in the selected text region.

10. The method of claim 1, wherein each grayscale image of the plurality of grayscale images is generated using a different channel of the multi-channel image.

11. The method of claim 1, wherein the multi-channel image includes a first number of channels, the plurality of grayscale images includes a second number of grayscale images, and the second number is less than or equal to the first number.

12. The method of claim 1, further comprising, in response to identifying two or more text regions of the at least one text region that are in two or more of the plurality of grayscale images, merging the two or more text regions from the two or more of the plurality of grayscale images to generate a merged text region before determining text region information from the merged text region.

13. An apparatus comprising:
at least one image converter configured to generate a plurality of grayscale images from a multi-channel image, the plurality of grayscale images comprising a first grayscale image and a second grayscale image, the first grayscale image distinct from the second grayscale image;
a plurality of text region detectors configured to identify at least one text region in the plurality of grayscale images and to determine text region information from the at least one text region; and
a merging unit configured to generate text information of the multi-channel image based on the text region information.

14. The apparatus of claim 13, wherein the text region information includes first text region information and second text region information, the first text region information includes first location information of a first candidate text region and the second text region information includes second location information of a second candidate text region.

15. The apparatus of claim 13, wherein the plurality of text region detectors is configured to:
identify at least one non-candidate text region in the plurality of grayscale images; and
in response to two or more non-candidate text regions of the at least one non-candidate text region being identified in two or more of the plurality of grayscale images, identify a common portion of the two or more non-candidate text regions.

16. The apparatus of claim 15, wherein the plurality of text region detectors is further configured
to add the common portion to at least one candidate text region to create an adjusted candidate text region.

17. The apparatus of claim 13, wherein the plurality of text region detectors is configured to, responsive to two or more text regions of the at least one text region being identified in two or more of the plurality of grayscale images, determine a text confidence value for recognized text in each of the identified text regions.

18. The apparatus of claim 13, wherein the plurality of text region detectors is configured to determine a region confidence value for each text region of the at least one text region.

19. The apparatus of claim 18, wherein the plurality of text region detectors is further configured to identify a location for each text region of the at least one text region, and wherein the merging unit is configured to:
in response to a determination that two or more text regions of the at least one text region are identified in two or more of the plurality of grayscale images and that the identified locations of at least two of the identified text regions overlap at least in part, select one of the at least two overlapping text regions as a selected text region; and recognize text in the selected text region.

20. An apparatus comprising:
means for generating a plurality of grayscale images from a multi-channel image, the plurality of grayscale images comprising a first grayscale image and a second grayscale image, the first grayscale image distinct from the second grayscale image;
means for identifying at least one text region in the plurality of grayscale images and for determining text region information from the at least one text region; and
means for generating text information of the multi-channel image based on the text region information.

21. The apparatus of claim 20, further comprising means for merging the text region information from two or more text regions of the at least one text region, the two or more text regions identified in two or more of the plurality of grayscale images, and wherein the means for identifying the at least one text region is configured to process the plurality of grayscale images in parallel.

22. A non-transitory computer-readable medium comprising instructions, that when executed by a processor cause the processor to:
generate a plurality of grayscale images from a multi-channel image, the plurality of grayscale images comprising a first grayscale image and a second grayscale image, the first grayscale image distinct from the second grayscale image;
identify at least one text region in the plurality of grayscale images;
determine text region information from the at least one text region; and
generate text information of the multi-channel image based on the text region information.

23. The medium of claim 22, wherein the first grayscale image is generated from a first channel of the multi-channel image and the second grayscale image is generated from a second channel of the multi-channel image, and wherein the first grayscale image is generated independently of the second channel.

24. A method of processing an image, the method comprising:
generating first grayscale image data using first channel data of multi-channel image data associated with a multi-channel image;
generating second grayscale image data using second channel data of the multi-channel image data, the first grayscale image data distinct from the second grayscale image data;
identifying first text region data in the first grayscale image data;
identifying second text region data in the second grayscale image data;
determining first text region information from the first text region data and second text region information from the second text region data; and
generating text information of the multi-channel image based on the first text region information and the second text region information.

25. The method of claim 24, wherein generating the text information includes merging the first and the second text region information, wherein the first channel corresponds to a first color channel of the multi-channel image, and wherein the second channel corresponds to a second color channel of the multi-channel image.

26. The method of claim 24, further comprising:
identifying, based on the first grayscale image data, one or more first homogenous regions of a gray scale image that corresponds to the first grayscale image data; and
identifying first candidate text region data in the first grayscale image data based on the one or more first homogenous regions.

27. The method of claim 24, wherein identifying the first text region data and identifying the second text region data are performed in parallel, and wherein identifying the first text region data includes:
identifying first candidate text region data in the first grayscale image data; and
identifying the first text region data in the identified first candidate text region data, and
wherein identifying the second text region data includes:
identifying a second candidate text region data in the second grayscale image data; and
identifying the second text region data in the identified second candidate text region data.

28. The method of claim 24, further comprising:
estimating a first load to process first candidate text region data; and
estimating a second load to process second candidate text region data.

29. The method of claim 28, further comprising adjusting the first candidate text region data and the second candidate text region data to generate first load-balanced candidate text region data and second load-balanced candidate text region data based on the first load and the second load, wherein the first text region data is identified in the first load-balanced candidate text region data.

30. The method of claim 29, wherein the first candidate text region data and the second candidate text region data are adjusted by removing a portion of the first candidate text region data from the first candidate text region data and adding the portion of the first candidate text region data to the second candidate text region data.

31. The method of claim 24, further comprising removing a portion of the first text region data and adding the portion to the second text region data before determining text region information from the first text region data and from the second text region data.

32. The method of claim 24, wherein the first grayscale image data is generated independently of the second channel, and wherein the second grayscale image data is processed in parallel with the first grayscale image data.

33. An apparatus comprising:
at least one image converter configured to generate first grayscale image data using first channel data of multi-channel image data associated with a multi-channel image, the at least one image converter further configured to generate second grayscale image data using second channel data of the multi-channel image data, the first grayscale image data distinct from the second grayscale image data;
a first text region detector configured to identify first text region data in the first grayscale image data and to determine first text region information from the first text region data;
a second text region detector configured to identify second text region data in the second grayscale image data and to determine second text region information from the second text region data; and a merging unit configured to generate text information of the multi-channel image based on the first text region information and the second text region information.

34. The apparatus of claim 33, wherein the merging unit is configured to merge the first text region information and the second text region information, and wherein the first text region detector is configured to process the first grayscale image data, the second text region detector is configured to process the second grayscale image data.

35. The apparatus of claim 33, wherein the first text region information includes first location information of first candidate text region data and the second text region information includes second location information of second candidate text region data.

36. The apparatus of claim 33, wherein the first text region detector is configured to:
identify first candidate text region data in the first grayscale image data; and
identify the first text region data in the identified first candidate text region data, and
wherein the second text region detector is configured to:
identify second candidate text region data in the second grayscale image data; and
identify the second text region data in the identified second candidate text region data.

37. The apparatus of claim 33, further comprising a load controller configured to adjust first candidate text region data and second candidate text region data to generate first load-balanced candidate text region data and second load-balanced candidate text region data based on a first estimated load and a second estimated load.

38. The apparatus of claim 37, wherein the load controller is configured to adjust the first candidate text region data and the second candidate text region data by removing a portion of the first candidate text region data from the first candidate text region data and adding the portion of the first candidate text region data to the second candidate text region data.

39. The apparatus of claim 33, wherein the at least one image converter comprises a first image converter configured to generate the first grayscale image data and a second image converter configured to generate the second grayscale image data.

40. An apparatus comprising:
means for generating first grayscale image data and second grayscale image data from multi-channel image data associated with a multi-channel image, the first grayscale image data generated using first channel data of the multi-channel image data, the second grayscale image data generated using second channel data of the multi-channel image data, the first grayscale image data distinct from the second grayscale image data;
means for identifying first text region data in the first grayscale image data and determining first text region information from the first text region data;
means for identifying second text region data in the second grayscale image data and determining second text region information from the second text region data; and
means for generating text information of the multi-channel image based on the first and the second text region information.

41. The apparatus of claim 40, further comprising means for identifying first candidate text region data in the first grayscale image.

42. The apparatus of claim 41, further comprising means for adjusting the first candidate text region data to generate first load-balanced candidate text region data based on a first estimated load.

43. A non-transitory computer-readable medium comprising instructions, that when executed by a processor cause the processor to:
generate first grayscale image data and second grayscale image data from multi-channel image data associated with a multi-channel image, the first grayscale image data generated using first channel data of the multi-channel image data, the second grayscale image data generated using second channel data of the multi-channel image data, the first grayscale image data distinct from the second grayscale image data;
identify first text region data in the first grayscale image data;
identify second text region data in the second grayscale image data;
determine first text region information and second text region information from the first text region data and the second text region data, respectively; and
generate text information of the multi-channel image based on the first text region information and the second text region information.

44. The medium of claim 43, wherein the instructions that cause the processor to identify the first text region, further cause the processor to:
identify first candidate text region data in the first grayscale image data; and
identify the first text region data in the identified first candidate text region data,
wherein identifying the second text region includes:
identifying second candidate text region data in the second grayscale image data; and
identifying the second text region data in the identified second candidate text region data.

45. The medium of claim 44, wherein the instructions, when executed by the processor, further cause the processor to:
estimate a first load to process the first candidate text region data based on a size of the first candidate text region data; and
estimate a second load to process the second candidate text region data.

46. The medium of claim 45, wherein the instructions, when executed by the processor, further cause the processor to:
adjust the first candidate text region data to generate first load-balanced candidate text region data based on the first load and the second load, wherein the first text region information is determined from the first load-balanced candidate text region data; and
adjust the second candidate text region data to generate second load-balanced candidate text region data based on the first load and the second load, wherein the second text region information is determined from the second load-balanced candidate text region data,
wherein the first candidate text region data and the second candidate text region data are adjusted by removing a portion of the first candidate text region data from the first candidate text region data and adding the portion of the first candidate text region data to the second candidate text region data.

* * * * *